US011836334B2

(12) United States Patent
Abdulaal et al.

(10) Patent No.: US 11,836,334 B2
(45) Date of Patent: *Dec. 5, 2023

(54) MACHINE LEARNING-BASED INTERACTIVE VISUAL MONITORING TOOL FOR HIGH DIMENSIONAL DATA SETS ACROSS MULTIPLE KPIS

(71) Applicant: eBay Inc., San Jose, CA (US)

(72) Inventors: Ahmed Reda Mohamed Saeid Abdulaal, San Jose, CA (US); Bass Chorng, Fremont, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/752,113

(22) Filed: May 24, 2022

(65) Prior Publication Data
US 2022/0283695 A1    Sep. 8, 2022

Related U.S. Application Data

(63) Continuation of application No. 17/228,235, filed on Apr. 12, 2021, which is a continuation-in-part of
(Continued)

(51) Int. Cl.
*G06F 3/04842* (2022.01)
*G06N 3/04* (2023.01)
(Continued)

(52) U.S. Cl.
CPC ........... *G06F 3/04842* (2013.01); *G06N 3/04* (2013.01); *G06N 3/088* (2013.01); *G06N 5/04* (2013.01); *G06N 20/20* (2019.01); *H04L 41/22* (2013.01)

(58) Field of Classification Search
CPC .......... G06N 5/04; G06N 5/003; G06N 20/20; G06F 11/3006; G06F 11/328; G06Q 30/0633; G06Q 40/02
See application file for complete search history.

(56) References Cited

U.S. PATENT DOCUMENTS 6,643,613 B2  11/2003 McGee et al.
6,975,330 B1  12/2005 Charlton et al.
(Continued)

FOREIGN PATENT DOCUMENTS

CN    104915735    9/2015

OTHER PUBLICATIONS

Digital Viz Project; Radial Heat Map; https://web.archive.org/web/20160817094545/https://datavizproject.com/data-type//radial-heatmap/; Aug. 2016 (Year: 2016).*
(Continued)

*Primary Examiner* — Kevin T Bates
*Assistant Examiner* — Jihad K Boustany
(74) *Attorney, Agent, or Firm* — FIG. 1 Patents

(57) ABSTRACT

Described are computing systems and methods configured to detect a small, but meaningful, anomaly within one or more metrics associated with a platform. The system displays visuals of the metrics so that a user monitoring the platform can effectively notice a problem associated with the anomaly and take appropriate action to remediate the problem. An operational visual includes a radar-based visual with a heatmap arranging metrics, and a node representing a state of the metrics. Moreover, the system uses an ensemble of unsupervised machine learning algorithms for multi-dimensional clustering of hundreds of thousands of monitored metrics. Via the visuals and the implementation of the machine learning algorithms, the described techniques provide an improved way of representing and simulating many metrics being monitored for a platform. Moreover, the techniques are configured to expose actionable and useful information associated with the platform in a manner that can be effectively interpreted.

20 Claims, 24 Drawing Sheets

Related U.S. Application Data application No. 16/745,792, filed on Jan. 17, 2020, now Pat. No. 11,036,607, which is a continuation-in-part of application No. 16/745,822, filed on Jan. 17, 2020.

(60) Provisional application No. 62/897,164, filed on Sep. 6, 2019.

(51) Int. Cl.
*H04L 41/22* (2022.01)
*G06N 20/20* (2019.01)
*G06N 5/04* (2023.01)
*G06N 3/088* (2023.01)

(56) References Cited

U.S. PATENT DOCUMENTS

| | | | |
|---|---|---|---|
| RE42,663 | E | 8/2011 | Lazarus et al. |
| 8,630,891 | B2 | 1/2014 | Brocklebank |
| 9,197,511 | B2 | 11/2015 | Mathis |
| 10,198,339 | B2 | 2/2019 | Salunke et al. |
| 10,216,560 | B2 | 2/2019 | Ricken et al. |
| 10,387,801 | B2 | 8/2019 | Gulin et al. |
| 10,636,007 | B2 | 4/2020 | Runkana et al. |
| 11,036,607 | B2 | 6/2021 | Poole et al. |
| 11,593,682 | B2 | 2/2023 | Poole et al. |
| 2013/0169666 | A1 | 6/2013 | Pacheco et al. |
| 2013/0297767 | A1 | 11/2013 | Kozine et al. |
| 2014/0075018 | A1 | 3/2014 | Maycotte et al. |
| 2015/0033086 | A1 | 1/2015 | Sasturkar et al. |
| 2015/0213631 | A1* | 7/2015 | Vander Broek ........ G06Q 30/02 345/589 |
| 2015/0229532 | A1* | 8/2015 | Somaiya ................. H04L 41/40 715/736 |
| 2015/0229546 | A1 | 8/2015 | Somaiya et al. |
| 2016/0147583 | A1 | 5/2016 | Ben et al. |
| 2017/0083585 | A1 | 3/2017 | Chen et al. |
| 2017/0093645 | A1 | 3/2017 | Zhong et al. |
| 2017/0192872 | A1* | 7/2017 | Awad ................. G06F 11/3072 |
| 2017/0365080 | A1 | 12/2017 | Cardno et al. |
| 2018/0047071 | A1 | 2/2018 | Hsu et al. |
| 2018/0173894 | A1* | 6/2018 | Boehler ............. G06F 21/6254 |
| 2019/0026206 | A1* | 1/2019 | Harutyunyan ...... G06F 11/0781 |
| 2020/0159836 | A1* | 5/2020 | Alkan ..................... G06N 20/00 |
| 2020/0210264 | A1 | 7/2020 | Lavrentyev et al. |
| 2021/0073099 | A1 | 3/2021 | Poole et al. |
| 2021/0073658 | A1 | 3/2021 | Poole et al. |
| 2021/0232291 | A1 | 7/2021 | Abdulaal et al. |
| 2021/0264304 | A1 | 8/2021 | Poole et al. |

OTHER PUBLICATIONS

U.S. Appl. No. 16/745,792, , "Applicant Initiated Interview summary received for U.S. Appl. No. 16/745,792, dated Oct. 19, 2020", dated Oct. 19, 2020, 2 Pages.
U.S. Appl. No. 16/745,792, , "Applicant Initiated Interview Summary received for U.S. Appl. No. 16/745,792, dated Dec. 14, 2020", dated Dec. 14, 2020, 2 Pages.
U.S. Appl. No. 16/745,792, , "Final Office Action Received for U.S. Appl. No. 16/745,792, dated Nov. 16, 2020", dated Nov. 16, 2020, 23 Pages.
U.S. Appl. No. 16/745,792, , "Non Final Office Action Received for U.S. Appl. No. 16/745,792, dated Sep. 22, 2020", dated Sep. 22, 2020, 21 Pages.
U.S. Appl. No. 16/745,792, , "Notice of Allowability Received for U.S. Appl. No. 16/745,792, dated Apr. 1, 2021", dated Apr. 1, 2021, 2 Pages.
U.S. Appl. No. 16/745,792, , "Notice of Allowance Received for U.S. Appl. No. 16/745,792, dated Mar. 10, 2021", dated Mar. 10, 2021, 10 pages.
U.S. Appl. No. 16/745,792, , "Response to Final Office Action filed on Dec. 9, 2020 for U.S. Appl. No. 16/745,792, dated Nov. 16, 2020", filed Dec. 9, 2020, 10 pages.
U.S. Appl. No. 16/745,792, , "Response to Non-Final Office Action filed on Oct. 19, 2020 for U.S. Appl. No. 16/745,792, dated Sep. 22, 2020", filed Oct. 19, 2020, 11 Pages.
U.S. Appl. No. 17/228,235, , "Non Final Office Action Received for U.S. Appl. No. 17/228,235, dated Nov. 17, 2021", dated Nov. 17, 2021, 24 Pages.
U.S. Appl. No. 17/228,235, , "Notice of Allowance received for U.S. Appl. No. 17/228,235, dated Mar. 17, 2022", dated Mar. 17, 2022, 11 Pages.
U.S. Appl. No. 17/228,235, , "Supplemental Notice of Allowability", U.S. Appl. No. 17/228,235, dated Jun. 15, 2022, 2 pages.
U.S. Appl. No. 17/318,408, , "Final Office Action", U.S. Appl. No. 17/318,408, dated Aug. 8, 2022, 30 pages.
U.S. Appl. No. 17/318,408, , "Final Office Action received for U.S. Appl. No. 17/318,408, dated Dec. 30, 2021", dated Dec. 30, 2021, 26 Pages.
U.S. Appl. No. 17/318,408, , "Non Final Office Action Received for U.S. Appl. No. 17/318,408, dated Oct. 26, 2021", dated Oct. 26, 2021, 24 Pages.
U.S. Appl. No. 17/318,408, , "Non-final Office Action received for U.S. Appl. No. 17/318,408, dated Mar. 1, 2022", dated Mar. 1, 2022, 29 Pages.
Digital Viz Project, , "Radial Heat Map", The Internet Archive [retrieved Aug. 16, 2022]. Retrieved from the Internet <https://web.archive.org/web/20160817094545/https://datavizproject.com/data-type/radial-heatmap/>., Aug. 17, 2016, 11 pages.
Ghenis, , "Quantile Regression, from Linear Models to trees to Deep Learning", Retrieved from the Internet URL :< http://towardsdatascience/com/quantile-regression-from-linear-models-to-trees-to-deep-learning-af3738b527c3>, Oct. 16, 2018, 14 Pages.
Janetzko, et al., "Anomaly Detection For Visual Analytics Of Power Consumption Data", Computers & Graphics, vol. 38, Feb. 2014, 11 Pages.
Koehrsen, , "How to Generate Prediction Intervals with Scikit-Learn and Python", Retrieved from the Internet URL: https://towardsdatascience.com/how-to-generate-prediction-intervals-with-scikit-learn-and-python-ab3899f992ed, May 8, 2019, 14 Pages.
Meinshausen, , "Quantile Regression Forests", Journal of Machine Learning Research 7, Jun. 2006, 17 Pages.
Raschka, , "Mlxtend 0.9.0", Retrieved from Internet URL: https://sebastianraschka.com/pdf/software/mlxtend-latest.pdf, Oct. 21, 2017, 388 Pages.
Shi, et al., "Visual Analytics of Anomalous User Behaviors: A Survey", Retrieved from the Internet URL: <https://arxiv.org/abs/1905.06720>, May 21, 2019, 24 Pages.
22165862.8 , "Extended European search Report received for European Patent Application No. 22165862.8, dated Aug. 26, 2022", dated Aug. 26, 2022, 10 Pages.
U.S. Appl. No. 16/745,822 , "Non-Final Office Action", U.S. Appl. No. 16/745,822, dated Feb. 7, 2023, 22 pages.
U.S. Appl. No. 17/318,408 , "Notice of Allowance", U.S. Appl. No. 17/318,408, dated Dec. 2, 2022, 9 pages.
U.S. Appl. No. 17/318,408 , "Supplemental Notice of Allowability", U.S. Appl. No. 17/318,408, dated Feb. 1, 2023, 2 pages.
Farshchi, Mostafa , et al., "Metric selection and anomaly detection for cloud operations using log and metric correlation analysis", Journal of Systems and Software, vol. 137 [retrieved Feb. 7, 2023]. Retrieved from the Internet <https://doi.org/10.1016/j.jss.2017.03.012>, Mar. 2018, 19 pages.
Singh, Lavneet , et al., "Customer Life Time Value Model Framework Using Gradient Boost Trees with RANSAC Response Regularization", 2018 International Joint Conference on Neural Networks (IJCNN) [retrieved from the Internet <https://doi.org/10.1109/IJCNN.2018.8489710>, Jul. 2018, 8 pages.
Ulrich, Matthias , et al., "Distributional regression for demand forecasting in e-grocery", European Journal of Operational Research, vol. 294, No. 3 [retrieved Feb. 7, 2023]. Retrieved from the Internet <https://doi.org/10.1016/j.ejor.2019.11.029>, Nov. 2021, 30 pages.

(56) References Cited

OTHER PUBLICATIONS

U.S. Appl. No. 16/745,822, "Final Office Action", U.S. Appl. No. 16/745,822, dated Jun. 2, 2023, 22 pages.

* cited by examiner

300

302
A data manager module implemented at least partially in hardware of a computing device to receive data describing operation of an online platform, the data including a plurality of metrics monitored automatically and without user intervention

304
A visual manager module implemented at least partially in hardware of a computing device to generate an operational visual that represents the data, the operational visual including a radar-based visual, the radar-based visual including a heatmap arranging the plurality of metrics and a node representing an initial state of the plurality of metrics.

306
A visual rendering module implemented at least partially in hardware of a computing device to render the operational visual.

308
A user interface module implemented at least partially in hardware of a computing device to receive a user input selecting a simulation setting to apply to the operational visual.

310
A simulation manager module implemented at least partially in hardware of a computing device to generate based at least on the user input, simulated data of a simulated state of the online platform for one or more of the plurality of metrics under the simulation setting selected.

312
A visual updater module implemented at least partially in hardware of a computing device to update the operational visual, based on the simulated data, to represent the simulated state of the online platform.

314
A visual re-rendering module implemented at least partially in hardware of a computing device to render the updated operational visual.

*Fig. 3*

1100
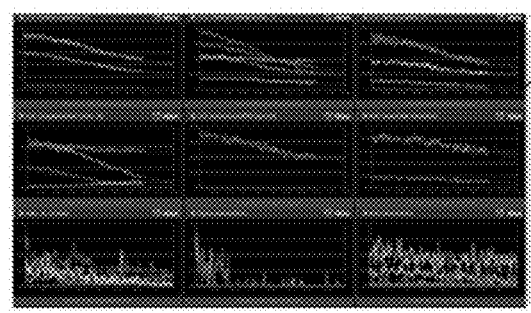
USER HAS TO VIEW LARGE NUMBER OF GRAPHS FOR LARGE NUMBER OF METRICS
1102
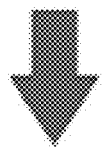
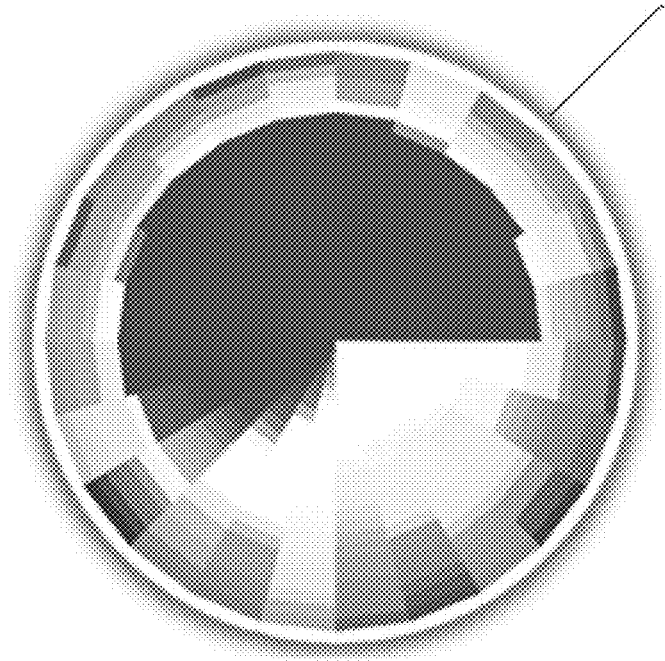
USER CAN VIEW HEALTH INDICATIONS FOR MONITORED METRICS IN ONE RADAR-BASED VISUAL
210
Fig. 11A 1300 

```
        ┌──────┐
        │ FIG. │
        │ 13A  │
        └──┬───┘
           ▼
┌─────────────────────────────────────────────────────────────────────┐
│ DETERMINE A TOTAL NUMBER OF AGENTS THAT HAVE A METRIC THAT SHARES AN ATTRIBUTE WITH │
│                          THE VOTED METRIC                           │
│                              1320                                   │
└─────────────────────────────────┬───────────────────────────────────┘
                                  ▼
┌─────────────────────────────────────────────────────────────────────┐
│        IDENTIFY A NUMBER OF VOTING AGENTS FROM THE TOTAL NUMBER OF AGENTS            │
│                              1322                                   │
└─────────────────────────────────┬───────────────────────────────────┘
                                  ▼
┌─────────────────────────────────────────────────────────────────────┐
│ GENERATE A PERCENTAGE FOR THE ATTRIBUTE BASED ON THE NUMBER OF VOTING AGENTS AND    │
│                      THE TOTAL NUMBER OF AGENTS                     │
│                              1324                                   │
└─────────────────────────────────┬───────────────────────────────────┘
                                  ▼
┌─────────────────────────────────────────────────────────────────────┐
│       DETERMINE WHETHER THE PERCENTAGE EXCEEDS A THRESHOLD PERCENTAGE                │
│                              1326                                   │
└─────────────────────────────────┬───────────────────────────────────┘
                                  ▼
┌─────────────────────────────────────────────────────────────────────┐
│ DETERMINE WHETHER A PROBLEM IS LOCALIZED TO THE ATTRIBUTE BASED ON THE DETERMINING   │
│            WHETHER THE PERCENTAGE EXCEEDS A THRESHOLD PERCENTAGE                     │
│                              1328                                   │
└─────────────────────────────────────────────────────────────────────┘
```

*Fig. 13B*

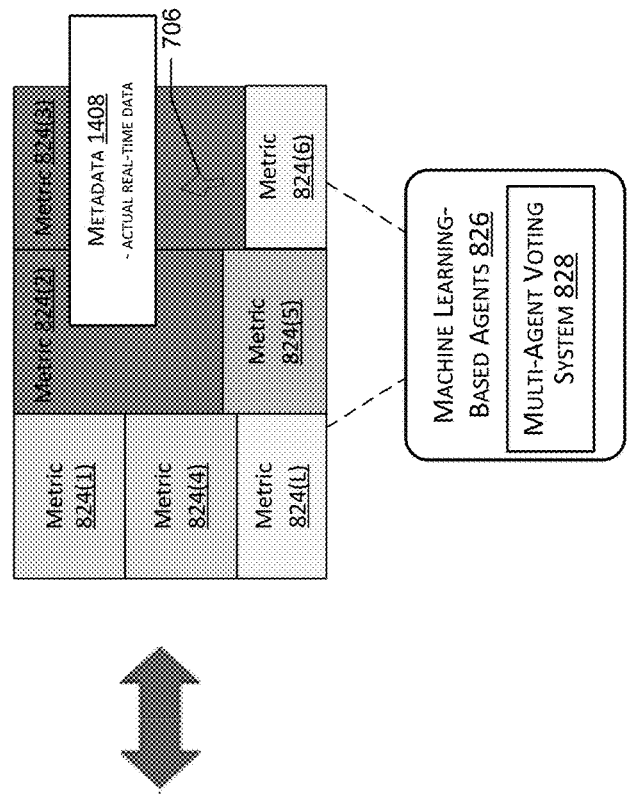
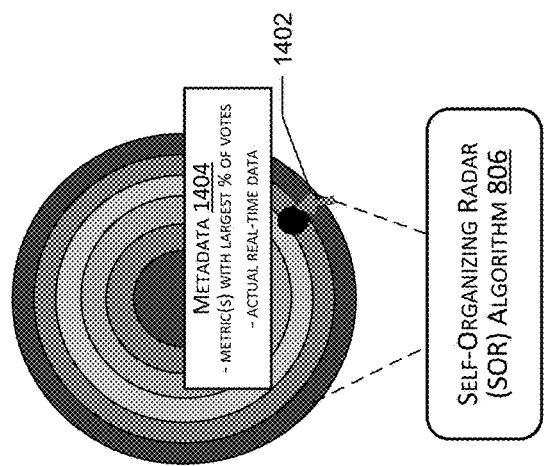
Fig. 14

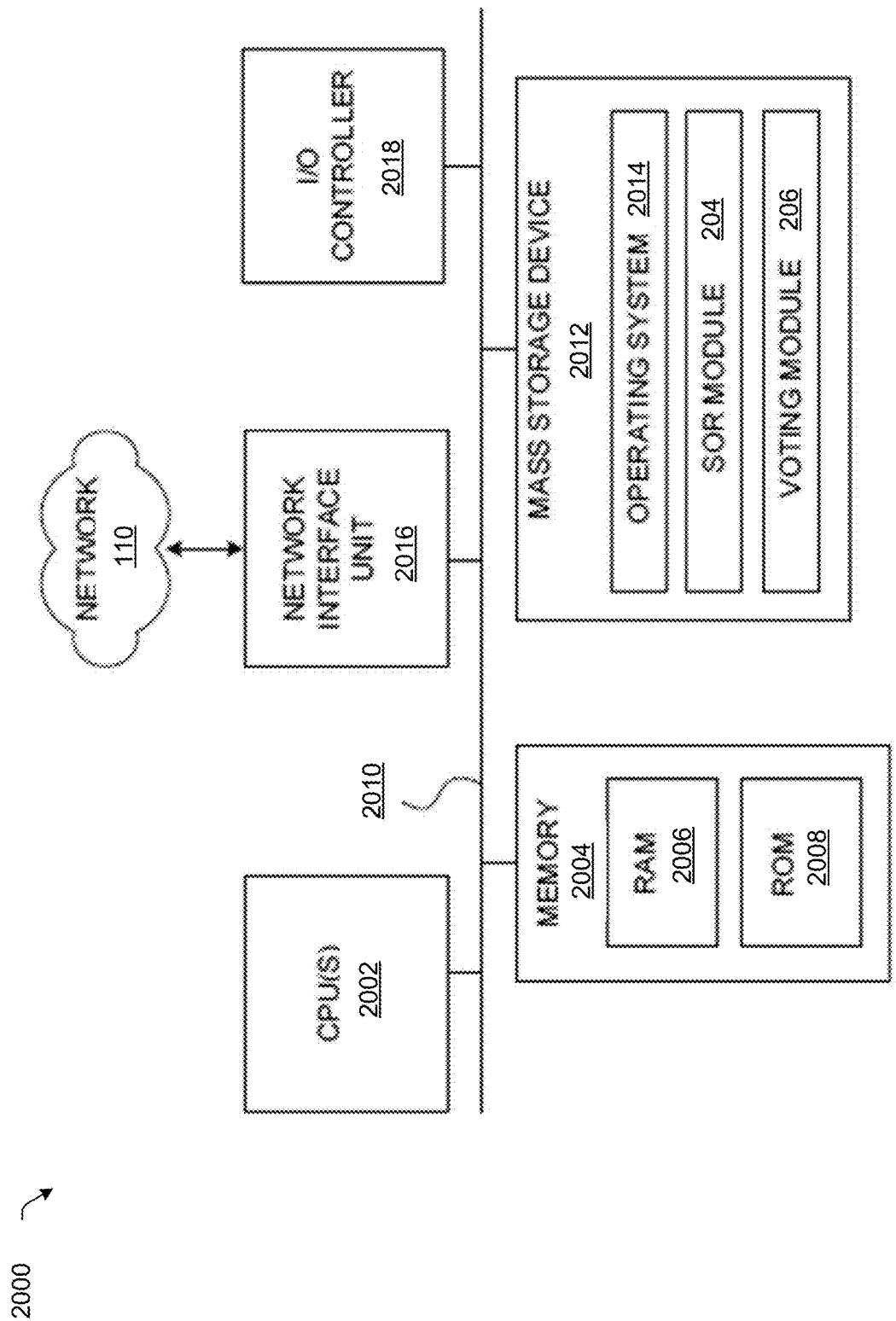

MACHINE LEARNING-BASED INTERACTIVE VISUAL MONITORING TOOL FOR HIGH DIMENSIONAL DATA SETS ACROSS MULTIPLE KPIS

RELATED APPLICATIONS

This application is a continuation of and claims the benefit of and priority to U.S. patent application Ser. No. 17/228,235 entitled "Machine Learning-Based Interactive Visual Monitoring Tool for High Dimensional Data Sets Across Multiple KPIs", filed Apr. 12, 2021, which claims priority as a continuation-in-part application to U.S. patent application Ser. No. 16/745,792 entitled "Visualization of High-Dimensional Data", filed Jan. 17, 2020, and U.S. patent application Ser. No. 16/745,822 entitled "Anomaly Detection by Correlated Metrics" filed Jan. 17, 2020, which claim priority to U.S. Provisional Application No. 62/897,164, filed Sep. 6, 2019 entitled "Dynamic Visualization of Metrics and Model Construction," the entire disclosures of which are incorporated herein by reference.

BACKGROUND

Machine learning is increasingly being utilized to perform a variety of tasks where patterns and inferences may be analyzed to monitor for problems that can arise in a system, such as a platform that hosts a website. More specifically, anomaly detection algorithms can be used to detect meaningful anomalies (e.g., deviations) to a set of metrics associated with the platform. Many of these anomalies are easily detected and/or noticed because they are represented by large dips or large spikes in the metrics being monitored. For instance, a metric being monitored may experience an unexpected and sharp decrease in data values over a short period of time (e.g., thirty seconds, two minutes, five minutes, etc.). Or, a metric being monitored may experience an unexpected and sharp increase in data values over a short period of time.

However, conventional anomaly detection algorithms are largely ineffective with regard to detecting small, but meaningful, anomalies that may be helpful in identifying a problem within a system before more serious consequences are realized. Consequently, conventional anomaly detection algorithms are unable to detect what may be referred to as a "slow bleed" anomaly, or a scenario where an actual data value for a metric being monitored is slightly different than an expected data value for the metric, but this slight difference may be a meaningful signal of a growing problem a platform is experiencing.

Additionally, conventional systems that implement these anomaly detection algorithms lack the ability to display information being generated in a way that enables a user monitoring hundreds of metrics associated with a platform to effectively interpret the information and take appropriate action to remediate a problem. Moreover, independent user-expertise in making predictions of the state of a system, or even identifying system outliers or weaknesses, have historically been unreliable or inaccurate.

It is with respect to these and other technical considerations that the disclosure made herein is presented.

SUMMARY

The techniques described herein are configured to detect or predict a small, but meaningful, anomaly within one or more metrics associated with a platform being monitored. The techniques are configured to display visuals of the metrics so that a user monitoring the platform can effectively notice a problem associated with the anomaly and take appropriate action to remediate or prevent the problem. Moreover, the techniques use an ensemble of machine learning algorithms, with a multi-agent voting system, to detect the anomaly. Therefore, via the display of the visuals and the implementation of the machine learning algorithms, the techniques described herein provide an improved way of representing a large number of metrics (e.g., hundreds, thousands, etc.) being monitored for a platform, and for further representing a simulated state of the platform. Moreover, the techniques are configured to expose actionable and useful information associated with the platform in a manner that can be effectively interpreted by a user, such as a predicted future state of the platform.

The techniques described herein may be used in a scenario where one or more users are tasked with monitoring a set of metrics related to a platform, in real-time, in order to triage potential problems and/or take appropriate remedial actions. For example, users of a Site Reliability Engineering team may be tasked with monitoring hundreds or thousands of metrics related to a platform that supports a website. By way of example, the metrics being monitored may be key performance indicators ("KPIs"). The metrics being monitored may relate to a particular function or process of the platform, such as the ability for customers to purchase items via an electronic commerce site. In a more specific example, the metrics being monitored may relate to one or more of a customer being able to sign in, a customer being able to check out, and so forth. The techniques may be used in other scenarios as well.

In some implementations, a broader category of metric, such as "checkout", can be divided into multiple sub-category metrics (e.g., "checkouts_completed" and "checkouts_cancelled"). Moreover, a metric may include varying attributes. For instance, the attributes can relate to a location in which a customer is purchasing an item from a website, a type of device being used to purchase the item, a payment method being used to pay for the item, and so forth. Accordingly, the set of metrics being monitored can be expansive and can quickly stretch into the hundreds or thousands depending on the function or process of a platform being monitored, a number of categories and/or sub-categories that compose the metrics, and/or a number of attributes that can vary from one metric to the next.

To further illustrate how attributes can vary, a "checkouts_completed" metric can have individual metrics for check outs by customers in different countries, such as the United States of America, Great Britain, Australia, France, Russia, South Africa, Brazil, etc. The "checkouts_completed" metric can additionally have individual metrics for check outs performed using different types of devices, such as IPHONE devices, ANDROID devices, and/or other types of devices. The "checkouts_completed" metric can further have individual metrics for check outs in which items are paid for using different payment methods, such as PAYPAL, a credit card, and/or other types of payment methods. An individual metric can include one or multiple attributes, and one varying attribute may result in a different metric being monitored. For example, the following are different "checkout" metrics that may be monitored:

an "checkouts_completed_overall" metric (e.g., all checkouts implemented using the platform regardless of location, device, and payment method), a "checkouts_completed_USA_IPHONE_PAYPAL" metric, a "checkouts_completed_AUSTRALIA_IPHONE_PAY-PAL" metric,
a "checkouts_completed_USA_ANDROID_PAYPAL" metric,
a "checkouts_completed_USA_IPHONE_creditcard" metric.

Based on the description above, one can see that the number of metrics being monitored can be large and can quickly grow as the platform supporting a website expands to accommodate different locations, different devices, different payment methods, and/or other distinguishing attributes. The system described herein helps reduce the complexities in monitoring a large number of metrics for anomalies by generating and displaying multiple visuals that represent data (e.g., real-time or near real-time data values) associated with the metrics being monitored. Using the data associated with the metrics being monitored, the system can generate and display an visual to provide a high-level indication of whether the platform is healthy. A platform may be healthy when the data values associated with the metrics are not deviating from expected or predicted data values in a meaningful manner. The visual can be updated in real-time as the data associated with the metrics continues to be received by the system.

Technical advantages of user interfaces described herein include the ability to monitor hundreds or thousands of metrics in real-time using a visual, such as an operational visual, a radar-based visual, and so forth. This leads to scalability and efficiency because so many metrics may be monitored and displayed at once. Because traditional methods of metrics display may be avoided, this also leads to a more memory and CPU efficient method of metrics display. Still further, because the visualization of many metrics is possible in a compact form, the visual may also be technically advantageous for monitoring many metrics on a compact computer device, such as a mobile phone with a limited size display screen. In addition, the platform is more efficient because the client devices of the platform can quickly check a visualization of many metrics, such as the operational visual or an updated operational visual representing simulated data based on applied simulation settings (e.g., a future point in time), and the user can accurately link to any metric that shows a problem (e.g., a current problem, a future problem, a past problem, a traffic load problem, and so forth).

In various examples, one visual may be an operational visual that represents data describing operation of an online platform. The operational visual may include other visuals, such as a radar-based visual on which an object (e.g., a dot, a database node, a node) derived from the underlying data can be plotted. The operational visual or the radar-based visual can be generated, at least in part, using an unsupervised artificial neural network algorithm that projects high-dimensional data onto a two-dimensional map. For instance, the operational visual or the radar-based visual may be generated using a custom modification of self-organizing map (SOM). The self-organizing map may be built using a broader category of metrics, such as those related to a customer checking out.

An object (e.g., a node) plotted on the radar-based visual can represent data associated with a combination of metrics related to an aspect of the platform being monitored (e.g., "checkouts_completed"). The way in which the radar-based visual is configured for display enables the object to signal anomalous activity associated with the combination of metrics. For example, a location of the object is determined based on matching current, real-time data associated with the combination of metrics to a closest observation of historic data of the combination of metrics. Accordingly, regions towards the center of the radar-based visual may represent more common scenarios that are frequently observed for the data. Regions towards the periphery of the radar-based visual represent more uncommon scenarios that are less frequently observed for the data. As a result, anomalous activity may be signaled as the plotted location of the object moves toward the periphery of the radar-based visual over time. In contrast, if the plotted location of the object remains towards the center of the radar-based visual, then the plotted location of the object may signal normal activity associated with the combination of metrics. The movement of the object from the center towards the periphery of the radar-based visual can be viewed by a user over time, and the user can use his or her judgment to determine whether an issue should be further investigated based on the location of the object.

The radar-based visual can include different color regions and/or shades (e.g., a heatmap) to help signal a problem. For example, the inner part of the radar-based visual around a center point may be different shades of blue (e.g., darker shades of blue toward the center that turn to lighter shades when looking outward toward the periphery). The outer part of the radar-based visual may be different shades of red (e.g., darker shades or red toward the periphery that turn to lighter shades when looking inward toward the center). A user can notice when the object starts to move from a darkly-shaded blue region near the center of the radar-based visual, which can be a strong signal of normal activity for the combination of metrics represented by the object, towards a darkly-shaded red region near the periphery of the radar-based visual, which can be a strong signal of anomalous activity for the combination of metrics represented by the object.

Another signal of an anomaly can include an increase in a size of the object (e.g., the size of a dot). A size of the object represents a degree to which the real-time, simulated, or predicted data for the combination of metrics is anomalous to the observed historic data. It is possible that that the object may be located near the center of the radar-based visual, yet one or more of the real-time simulated, or predicted metric values is foreign and is not commonly seen in the historical data. In a specific example, a large number of metrics being monitored may have normal values that closely match historical observations, but a small number of metrics (e.g., one, two, three, etc.) being monitored may have real-time, simulated, or predicted values that are not commonly observed or that have never been observed before (e.g., foreign values). In this situation, the increased size of the object can be used to signal the anomaly because the location of the object is likely to be plotted towards the center of the radar-based visual due to the normal observations of the larger number of metrics.

In some examples, the movement of a plotted object and a size of the plotted object can work together to signal an anomaly. This may be useful because a plotted object in a red region alone may occur due to an impact of a peak period, a slow period, or some other factor that may signal an abnormality but may not entirely be abnormal. Accordingly, a size of the plotted object can provide a strong indication of the anomalous behavior because the size of the plotted object can indicate that this observation has not occurred before during training.

The system can also generate and render an updated operational visual based on a received user input, such as a recognized action (e.g., clicking, tapping, and so forth), gesture, or verbal utterance. Such a user input may also be received via interactive sliders, number input, and so forth. One or more user inputs may be received, such that multiple simulation settings or conditions are applied, previous user input may be removed, and so forth. For example, user input indicating changes in simulation settings of both traffic conditions and a point in time may be received. In one implementation, interactive sliders can receive user input (e.g., selecting, dragging, and so forth) such that different settings, such as timeline properties of charted attributes, KPIs, or services, are altered, applied, updated, or removed.

Using the data associated with metrics being monitored, the system can also generate and display a different visual that enables a user to localize a problem to a smaller group of metrics being monitored, enabling a user to determine which metrics, out of hundreds or thousands of metrics being monitored, are experiencing anomalous activity.

In various examples, one such different visual may be a tree map visual that includes a plurality of sections. Each section in the tree map visual can be associated with a specific attribute used to compose one or more of the metrics being monitored (e.g., the "checkout" metrics). A size and/or a color of an individual section can be used to indicate anomalous activity for the specific attribute. As described above, the specific attribute may be a location of multiple different locations from which customers can purchase an item via an electronic commerce site and supporting platform (e.g., the United States of America, Great Britain, Australia, France, Russia, South Africa, Brazil, etc.), a type of device of multiple different types of devices that can be used by customers to purchase an item via the electronic commerce site and supporting platform (e.g., IPHONE, ANDROID, etc.), a payment method of multiple different payments methods that customers can use to purchase an item via the electronic commerce site and supporting platform (e.g., PAYPAL, credit card, etc.), and so forth.

A user can interact with the tree map visual to localize the problem to a smaller group of metrics. For example, the user may notice a larger, red section in the tree map visual which signals anomalous activity for a specific attribute (e.g., the United States of America, IPHONE, PAYPAL, etc.). The user may then select the section associated with the specific attribute. The system may then receive the user input that selects the section of the tree map visual and updates the operational visual, the radar-based visual, and/or the tree map visual so that only metrics related to the specific attribute are represented. In other words, a smaller group of metrics, which are related to the specific attribute, are used to rebuild one or all of the operational visual, the radar-based visual, and the tree map visual based on the user input.

Consequently, the system described herein provides a real-time, interactive application where a user may initially notice a problem by viewing an object that is growing in size and/or moving towards or in the periphery of the radar-based visual, and then the user can interact with the operational visual or another detailed visual, for a deeper view of the interrelated components or to better understand the problem. It is to be appreciated that the radar-based visual may show one or more objects, and each object may represent multiple metrics. In various examples, the system described herein provides an interactive application where a user may notice a future problem by applying different simulation settings to the real-time data, thus generating and rendering a representation of simulated data of a simulated state of the online platform.

In various examples described herein, the radar-based visual that provides a high-level overview of the health of the platform can be generated using a modified version of the "self-organizing map" (SOM) algorithm (i.e., "Kohonen's network"). The SOM algorithm achieves low-dimensional views of high-dimensional data. For example, high-dimensional data can be mapped into a two-dimensional data matrix using the algorithm and then the two-dimensional data matrix can be visualized as a heatmap. The modified version of the SOM algorithm accounts for time-series data and alters the output representation so that a symmetric radar-based visual is displayed. Thus, the modified version of the SOM algorithm may be referred to herein as the "self-organizing radar" (SOR) algorithm.

The way in which the radar-based visual is configured enables an object representing a combination of metrics to generally signal anomalous activity as the plotted location of the object moves or is located toward the periphery of the radar-based visual over time. In contrast, if the plotted location of the object remains towards the center of the radar-based visual, then the plotted location of the object generally signals normal activity associated with the combination of metrics. This provides an effective and an efficient way for a user to notice a problem early on before the problem fully develops and causes more serious consequences. Compared to conventional techniques, the user is not required to examine or interpret large amounts of complicated information, such as mathematical equations, numerical values/coefficients, value comparisons to thresholds, multiple charts, etc., in order to determine that a problem exists.

In various examples described herein, the tree map visual can be generated using a multi-agent voting system of various machine learning agents. In one implementation, an agent is a regression model coupled with a Quantile Loss Gradient Boosted Trees (QLGBT) machine learning model for vote-decision making. The system analyzes the metrics being monitored and determines which metrics are highly correlated to distribute on the agents. For instance, the system can use independent regressors to determine that a first metric and a second metric satisfy a correlation threshold, and therefore are highly correlated and can be assigned to one or more agents. If a first metric and a second metric are highly correlated, a data value for the first metric can be confidently used by an agent to predict a data value for the second metric using the agent's regression method of choice (e.g., polynomial regression). In a more specific example, a historic analysis of data values can be used to identify a correlation in which a data value for a "checkouts_completed" metric can be used to predict a data value for a "checkouts_cancelled" metric. In another specific example, a historic analysis of data values can be used to identify a correlation in which a data value for a "checkouts_completed_France" metric can be used to predict a data value for a "checkouts_completed_overall" metric.

Given two highly correlated metrics, an agent generates a prediction model so that a data value of a first metric can predict a data value for a second metric. A prediction model can be generated for each set of highly correlated metrics by multiple different agents. Provided an actual data value for a particular metric, an agent is configured to compare the actual data value to the data values predicted by the agent's prediction model generated in association with the particular metric. The agent then uses its own prediction error and/or other exogenous factors, such as temporal factors, holiday factors, etc., to generate upper and lower quantile limits, or bounds, on the error using QLGBT. If the error in a predicted data value falls outside a confidence interval (e.g., the upper and lower bounds) when compared to the actual data value, then the agent provides a vote that signals an anomaly. In other words, a vote by an agent means that an error in predicting a data value for a metric was outside an acceptable error range. In various examples, the error is a normalized error (e.g., a percentage) that is agnostic to the scale of the data. In other examples, the error may be an absolute error.

The vote is associated with a particular metric based on whether the error falls outside the upper bound or the lower bound. For example, a first correlated metric may be associated with the upper bound and a second correlated metric may be associated with the lower bound. The agent may use this approach when an anomaly is associated with a decrease in values (e.g., a dip). If the error in predicting the data value is outside the upper bound, the first correlated metric receives the vote and is therefore the voted metric. If the error in predicting the data value is outside the lower bound, the second correlated metric receives the vote and is therefore the voted metric. In another example, the first correlated metric may be associated with the lower bound and the second correlated metric may be associated with the upper bound. The agent may use this approach when an anomaly is associated with an increase in values (e.g., a spike).

Once the votes are received from all the agents associated with a large correlated set of metrics being monitored (e.g., hundreds, thousands, etc.), the system can analyze the agents determined to be associated with the voted metric, and localize a problem to a specific attribute. The system can examine all the agents to determine a total number of agents that share an attribute (e.g., a location such as the United States of America) with the voted metric, without regard to whether the agent voted or not. Moreover, the system can examine the voting agents to determine a number of the voting agents that share the same attribute (e.g., the location such as the United States of America) with the voted metric.

If a percentage determined based on the number of the voting agents that share the attribute and the total number of agents that share the same attribute is greater than a predetermined threshold percentage (e.g., a percentage between seventy percent and ninety percent), then the system can determine that the problem is likely localized to that attribute. In a specific example, a threshold can be set to seventy-five percent, and thus, if eighty out of a total of one hundred agents that use a metric related to the United States of America attribute provide a vote signaling an anomaly, then the system can localize a problem to a specific location, i.e., the United States of America.

The system can use this information in the tree map visual to show that there may be a problem with respect to a particular attribute, such as the United States of America. That is, the system can increase the size and/or change the color of the section in the tree map visual that corresponds to the particular attribute. In one implementation, the size and/or the color of a section is related to a percentage of agents that vote for an error within a specific localization (e.g., a specific attribute).

Using a machine learning model, such as but not limited to the Quantile Loss Gradient Boosted Trees (QLGBT) machine learning model, to model an individual agent's decision within a multi-agent voting system, the system is able to provide higher sensitivity to a "slow bleed" anomaly, or a scenario where an actual data value for a metric is slightly different than an expected data value for the metric, but the slight difference may be a meaningful signal of a growing problem a platform is experiencing. Use of the multi-agent voting system also provides a higher resistance to false positives, because while a false positive in a single agent is likely, the chances of simultaneous occurrences of false positives in a larger number of agents is lower. Moreover, the diversity of the agents with respect to their assigned metrics, exogenous variables, and models used overcomes the bias resulting from the vulnerability of using a single model or limited set of metrics. Accordingly, the machine learning-based multi-agent voting system comprises a problem inference tool rather than a mere outlier detection tool.

While some of the examples described above relate to health monitoring of a website such as an electronic commerce site, the techniques can additionally or alternatively be applied to other examples in which other metrics and/or other platforms are being monitored. For instance, the techniques described herein can be used to: display visuals representing active listings and market status for a seller of items, to display visuals representing the segmentation of search results, or to display visuals representing a post-processing layer on top of a variety of possible artificial intelligence (AI) outputs. Equally, the examples above may be applied to other performance metrics, such as monitoring machine metrics in a data center, such as CPU utilization, memory utilization, disk activity, or other metrics.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion. The appended drawings illustrate, by way of example and not of limitation, various implementations of systems, methods, and computer program products implementing the inventive subject matter.

FIG. 3 is a flow diagram depicting a procedure in an example implementation wherein an operational visual is generated and rendered based on data describing operation of an online platform, simulated data of a simulated state of the online platform is generated based on a selected simulation setting, and an updated operational visual is further generated and rendered based on the simulated data.

FIG. 11A is a diagram that illustrates an example of how a user can use the radar-based visual to view information associated with monitored metrics rather than a large number of charts, where each chart is associated with an individual metric.

FIGS. 13A-13B include a flow diagram showing aspects of an illustrative method, according to one implementation disclosed herein.

FIG. 14 is a diagram that illustrates a radar-based visual and a tree map visual that can be displayed on a user interface, and how user input (e.g., a hover input associated with the object on the radar-based visual and/or a section of the tree map visual) can be provided to view metadata.

FIG. 20 is a computer architecture diagram illustrating aspects of an example computer architecture for a computer capable of executing the software components described herein.

DETAILED DESCRIPTION

Overview

In the following description, reference will be made to specific example implementations for carrying out the inventive subject matter. Examples of these specific implementations are illustrated in the accompanying drawings. It will be understood that these examples are not intended to limit the scope of the claims to the illustrated implementations. On the contrary, they are intended to cover alternatives, modifications, and equivalents as may be included within the scope of the disclosure. In the following description, specific details are set forth in order to provide a thorough understanding of the subject matter. Implementations may be practiced without some or all of these specific details.

The present disclosure relates to various technical aspects of implementing machine learning-based interactive visual monitoring for high dimensional data sets. In various implementations, monitoring system generates and renders operational visuals based on data received from one or more computing devices, the data describing operation of an online platform. In various implementations, the monitoring system further receives user input via one or more client devices, where the user input may select one or more settings (e.g., a simulation setting) to apply to the operational visual, causing the monitoring system to respond in accordance with recognized user input. Without limitation, the functionalities of the monitoring system may include transactional functions for payment and shipping arrangements, and/or search and discovery features, alert tools, or automated features that are triggered when particular conditions are met, for example. The disclosed technologies present technologies for generating visuals representing real-time monitored data or simulated data based on the real-time and historical data, which are useable to indicate a problem associated with the health of a platform in view of one or more simulated conditions, and enable a platform, system, or a user to identify a specific metric and/or a specific attribute with which the problem is associated. The disclosed technologies can enhance the functionality and efficiency of various machine learning systems and related applications.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
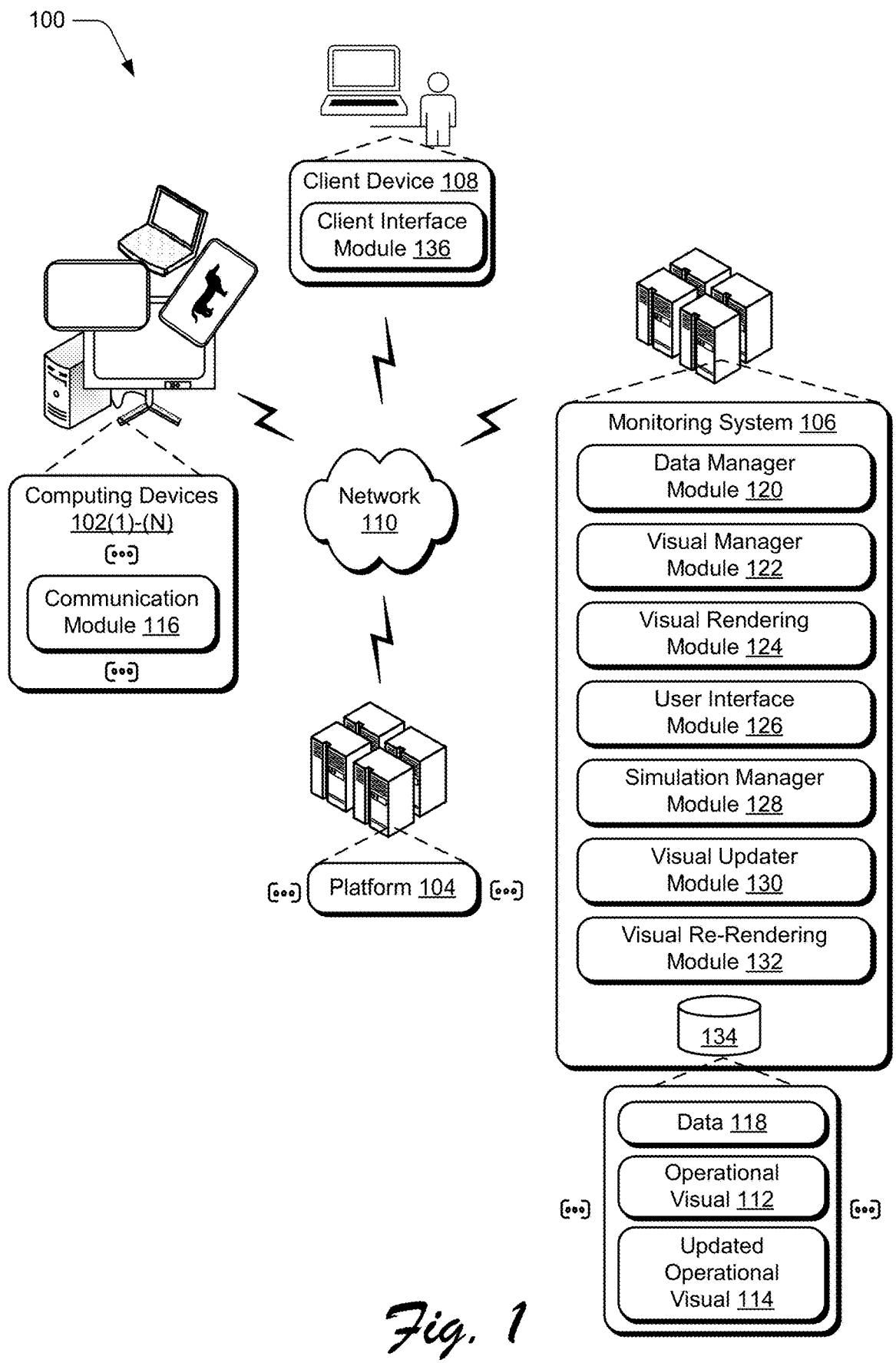
FIG. 1 is an illustration of an environment in an example implementation that is operable to employ techniques for machine learning-based interactive visual monitoring for high dimensional data sets described herein.

FIG. 1 is an illustration of a digital medium environment 100 in an example implementation that is operable to employ techniques for machine learning-based interactive visual monitoring for high dimensional data sets described herein. The illustrated environment 100 includes computing devices 102(1)-(N) (which may be referred to herein as "computing devices 102", where N in the context of FIG. 1 is a positive integer number that can be hundreds, thousands, hundreds of thousands, etc.), a platform 104, a monitoring system 106, and a client device 108, that are communicatively coupled, one to another, via a network 110. The computing devices 102 interact with the platform 104 to implement the particular function or process supported by the platform 104. The monitoring system 106 is configured to generate, render, and/or visuals such that a device, such as the client device 108, can display a visual (e.g., an operational visual 112 or an updated operational visual 114), which represents a health indication for operation of the platform 104, a predicted future state for the platform 104, a simulated state of the platform 104, and so forth, with or without human intervention.

The computing devices 102 can belong to a variety of classes of devices, such as server-type devices, desktop computer-type devices, mobile-type devices, special purpose-type devices, embedded-type devices, and/or wearable-type devices. Thus, computing devices 102 can include, but are not limited to, desktop computers, game consoles and/or gaming devices, tablet computers, personal data assistants (PDAs), mobile phone/tablet hybrids, laptop computers, telecommunication devices, wearable devices, virtual reality (VR) devices, augmented reality (AR) devices, automotive computers, network-enabled televisions, terminals, Internet of Things (IoT) devices, work stations, media players, personal video recorders (PVR), set-top boxes, or any other sort of computing devices.

In various examples, devices of the monitoring system 106 can include one or more computing devices that operate in a cluster or other grouped configuration to share resources, balance load, increase performance, provide failover support or redundancy, or for other purposes. For instance, the one or more devices of the monitoring system 106 can belong to a variety of classes of devices such as traditional server-type devices. The monitoring system 106, in an implementation, is configured to display visuals so that a client device 108 can localize a problem to one or more metrics and/or attributes of the platform 104 being monitored. In one configuration, the monitoring system 106 can be a part of the platform 104. Alternatively, the monitoring system 106 can be a separate system that can be called upon by the platform 104 to implement the monitoring described herein. The monitoring system may be configured in a variety of ways, such as to support instant messaging, social network communications (e.g., 'shares', posts, private messages), electronic messages, encrypted messages, ecommerce, email, and so forth.

The computing devices 102 are each configured to generate and send data associated with the monitored metrics, attributes, or KPIs of the platform 104 to the platform 104, the monitoring system 106, and/or the client device 108. Accordingly, FIG. 1 illustrates that the computing devices 102 generate and/or send the data associated with the monitored data 118 (may be referred to herein as the data 118) over one or more networks, represented as network 110, and the data 118 is received by the monitoring system 106.

A computing device of the computing devices 102 may include a communication module 116, which can be used to communicate data 118 (e.g., of monitored metrics, attributes, and so forth) to the monitoring system 106; the communication module 116 is implemented at least partially in hardware of the one or more computing devices 102 to interact with the platform 104, the monitoring system 106, and the client device 108 made accessible via the network(s) 110.

In one example, the platform 104 can include resources (e.g., processing resources, networking resources, storage resources, etc.) that support a website, such as an electronic commerce site. The platform 104 may be or include a server, web site, mobile app, voice interface, phone ordering system, or other technical implementation. In some implementations, the platform 104 is implemented by a server (including one or more server computers), operated by, on behalf, and/or under the control of the monitoring system 106, that exposes some of the monitoring system 106's functionality, e.g., via a web site and/or one or more APIs (e.g., web APIs). As an example, AMAZON®, ETSY®, ALIIBABA®, or others could integrate machine learning-based interactive visual monitoring for high dimensional data sets to adapt changes in services being monitored, decrease conventional reliance on unreliable human experts, provide visual monitoring for quantities of data that would be infeasible for a human expert to process, and provide more accurate assessments of the state of the online platform's monitored services (e.g., KPIs) across a variety of different scenarios, including real-time, past, and future scenarios.

Moreover, the computing devices 102 may tasked in part with site reliability engineering, monitoring hundreds or thousands of data 118, in real-time, in order to triage potential problems associated with the platform 104 and/or take appropriate remedial actions with or without human intervention. The data 118 being monitored may relate to a particular function or process supported by the platform 104, such as the ability for customers to purchase items or services via an electronic commerce site (e.g www.eBay.com).

While some of the examples described herein relate to health monitoring of a website such as an electronic commerce site, the techniques can additionally or alternatively be applied to other examples in which other metrics and/or other platforms are being monitored. For instance, the techniques described herein can be used to: generate simulated data based on a simulation setting received from the client device 108, render visuals representing multiple simulation settings (e.g., a future point in time, a past point in time, a particular traffic load, and so forth), display visuals representing KPIs of the platform 104, display visuals representing a post-processing layer on top of a variety of possible artificial intelligence (AI) outputs, and so forth.

The monitoring system 106 can comprise device(s) (e.g., servers) and/or other components that communicate with one another, with the platform 104, and/or with the computing devices 102 via one or more networks 110. Moreover, the monitoring system 106 can include a data manager module 120, a visual manager module 122, a visual rendering module 124, a user interface module 126, a simulation manager module 128, a visual updater module 130, and a visual re-rendering module 132. Further, the monitoring system includes a storage device 134 which may store a variety of things, such as the data 118, the operational visual 112, the updated operational visual 114, simulated or predicted data, and so forth. The number of illustrated modules is just an example, and the number can vary higher or lower. That is, functionality described herein in association with the illustrated modules can be performed by a fewer number of modules or a larger number of modules on one device or spread across multiple devices.

Using the data 118 being monitored, the visual manager module 122 can be used to generate an operational visual 112 to provide a high-level indication of whether the platform 104 is healthy, such as the platform 104's KPIs. The visual rendering module 124 can be used to render the operational visual 112 for display. The platform 104 may be healthy when the data 118 associated with the metrics are not deviating from expected or predicted data values in a meaningful manner. The operational visual 112 can be updated in real-time as the data 118 continues to be received by the monitoring system 106 over time. Similarly, the updated operational visual 114 and its associated simulated or predicted data can be updated in real-time as the data 118 continues to be received by the monitoring system 106 over time. The operational visual 112 and the updated operational visual 114 may include other visuals capable of displaying metrics, such as a radar-based visual, a tree map visual, a detailed grid view, and forth.

By generating and displaying the operational visual 112 or the updated operational visual 114, the monitoring system 106 provides a real-time, interactive application where the client device 108 can initially notice a problem, obtain a better understanding of the source of the problem, control aspects regarding the problem, and so forth. This is further described herein with respect to FIGS. 2A-2C.

Network 110 can include, for example, public networks such as the Internet, private networks such as an institutional and/or personal intranet, or some combination of private and public networks. Network 110 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network 110 can utilize communications protocols, including packet-based and/or datagram-based protocols such as internet protocol (IP), transmission control protocol (TCP), user datagram protocol (UDP), or other types of protocols. Moreover, network 110 can also include a number of devices that facilitate network communications and/or form a hardware basis for the networks, such as switches, routers, gateways, access points, firewalls, base stations, repeaters, backbone devices, and the like.

Computing devices that implement these devices and systems may be configured in a variety of ways. A computing device, for instance, may be configured as a desktop computer, a laptop computer, a mobile device (e.g., assuming a handheld configuration such as a tablet or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is depicted and described in some instances, a computing device may be representative of a plurality of different devices, such as multiple servers utilized by a business to perform operations "over the cloud" for the services of the platform and the monitoring service.

The client device 108 is configured to communicate with computing devices via the network 110 by using its client interface module 136. The client interface module 136 also enables the client device 108 to communicate with the monitoring system 106, the platform 104, and the computing devices 102. Communications supported by the client interface module 136 may be configured in a variety of ways. Examples of configurations of communications include notifications, alarms, instant messages, posts, emails, text messages, user input, QR codes, and other types of user interaction that may be communicated via the network 110.

In some instances, users may wish to apply a simulation setting to the operational visual, such that they have a better understanding of the KPIs of the online platform under a set of simulated circumstances. By way of example, a user may interact with the user interface of the client device 108 by adjusting one or more interactive sliders being displayed, such that a simulation setting is applied. In one implementation, one simulation setting is a future point in time, such as Mar. 13, 2024. In another example implementation, one simulation setting is a particular traffic load (e.g., 25%, 100%, 125%, or 500%). In yet another example implementation, one simulation setting is the addition of a new service or a removal of an old service of the online platform. Based on the selected simulation settings received via user input of the user interface of the client device, the client interface module 136 may communicate the selected simulation settings to the user interface module 126 of the monitoring system 106, beginning a process of generating simulated or predicted data based on the one or more selected simulation settings, via the simulation manager module 128, the visual updater module 130, and the visual re-rendering module 132 to generate and render an updated operational visual, which is stored in the storage device 134.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Monitoring System—Operational Visual, Updated Operational Visual

Figure 2A:
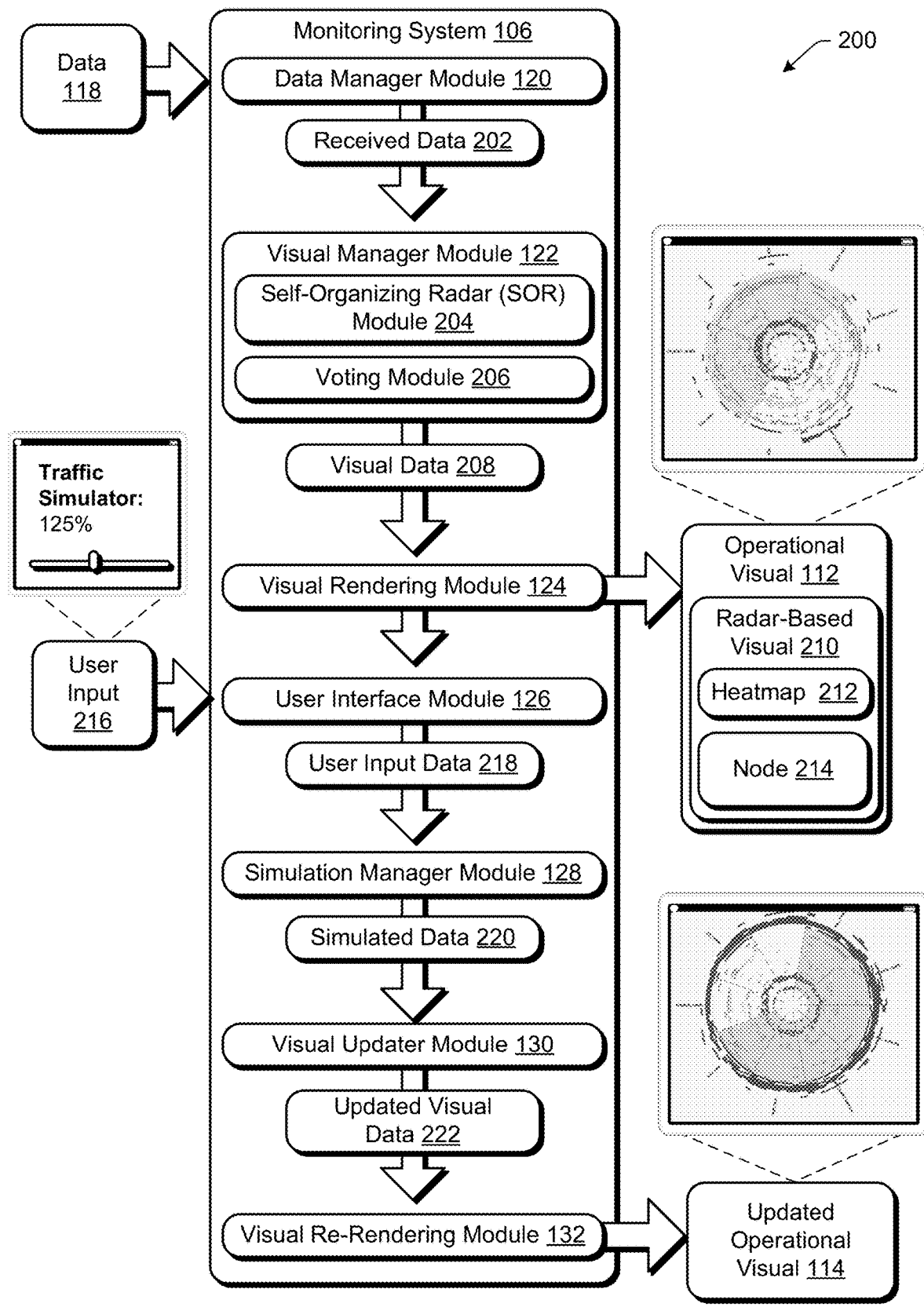
FIG. 2A depicts a system in an example implementation showing operation of a monitoring system of FIG. 1 in greater detail as generating and rendering an operational visual that represents data describing operation of an online platform, in addition to an updated operational visual based on a selected simulation setting.
Figure 2B:
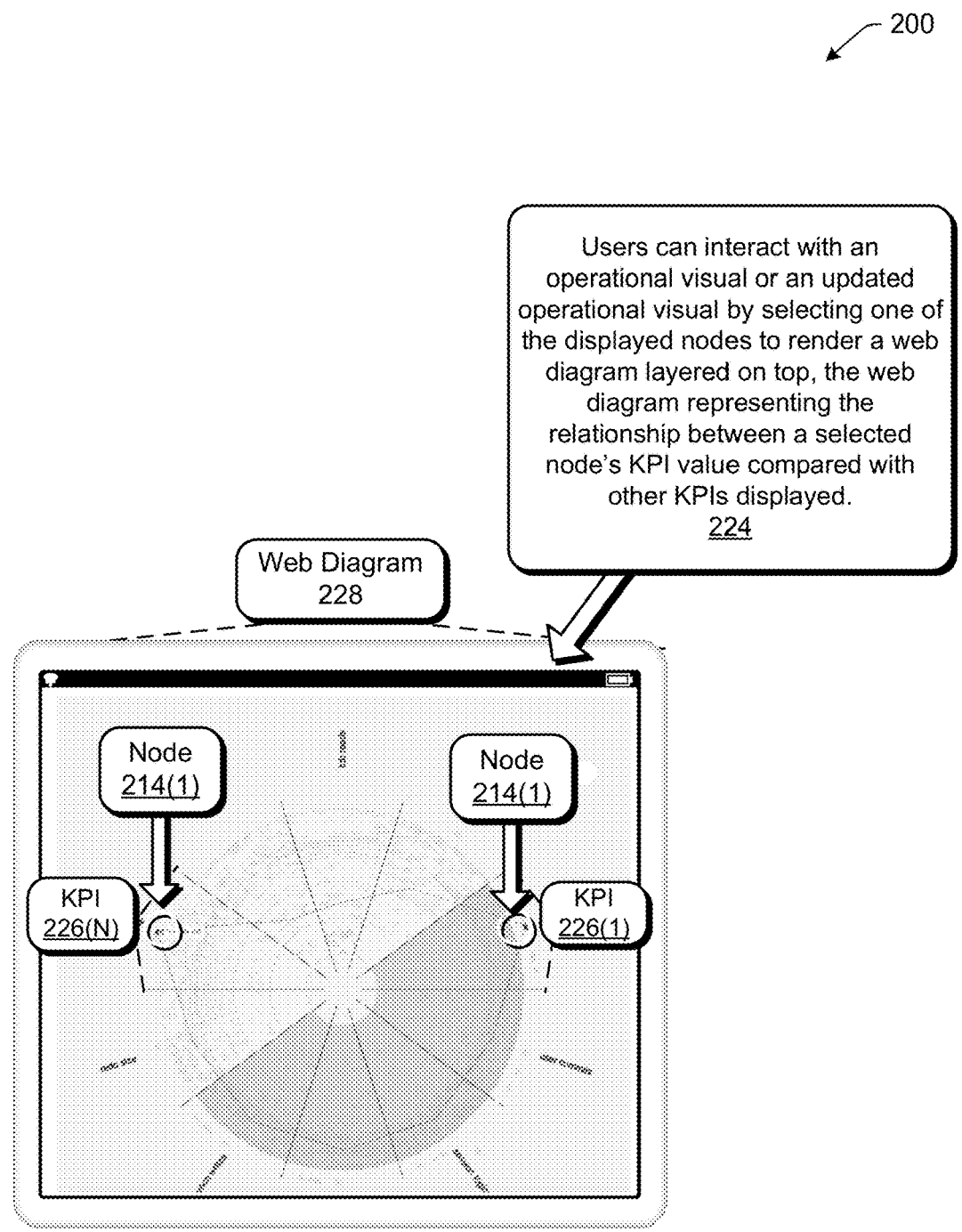
FIG. 2B is a diagram that illustrates a web diagram that overlays an operational visual or an updated operational visual, and how the web diagram can be used to visualize a representation of the relationship between a selected node's KPI value compared with other KPIs for the same node on the operational visual or the updated operational visual.
Figure 2C:
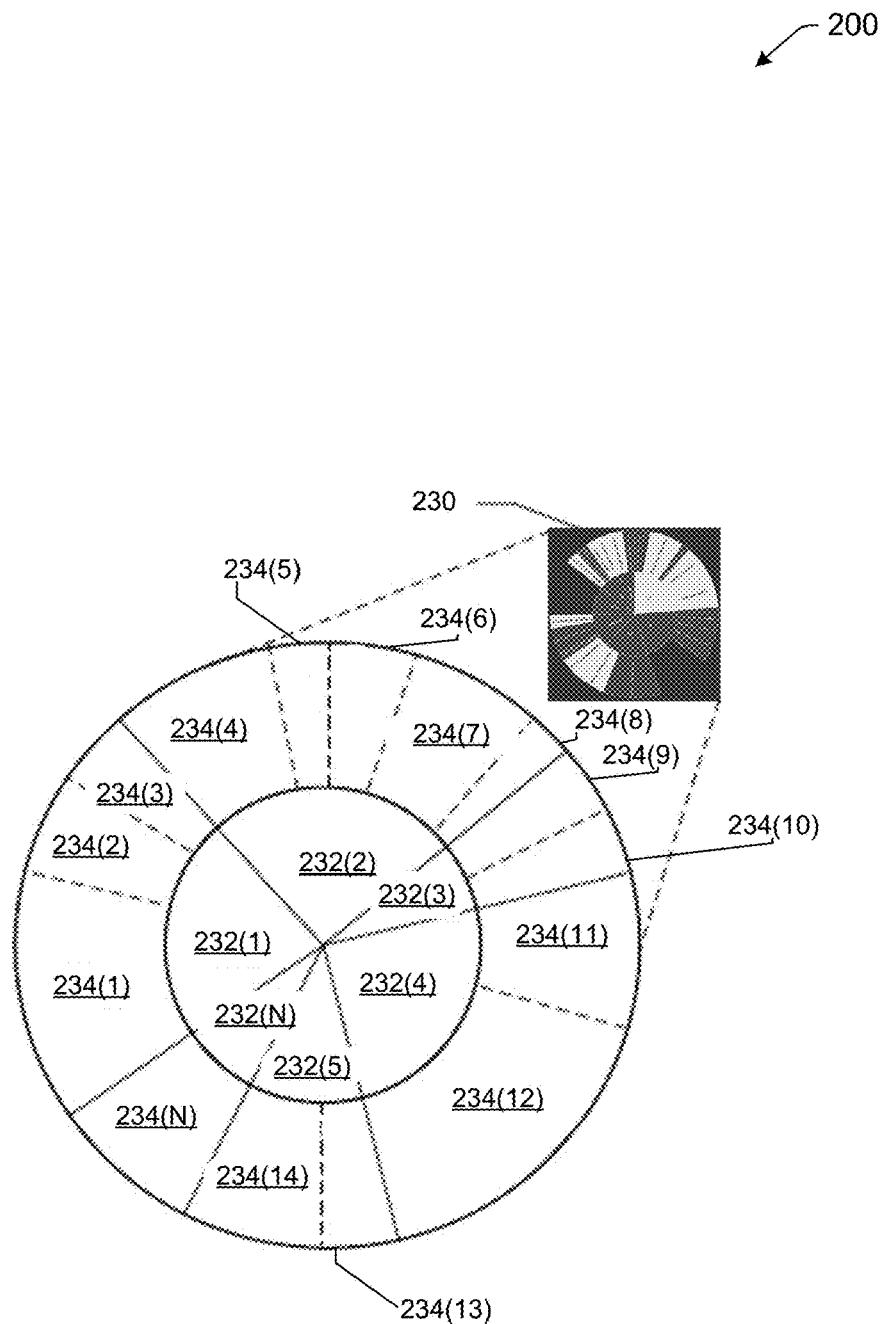
FIG. 2C is a diagram that illustrates an alternative visual (e.g., a "sunburst" visual) that can be displayed on a user interface, and how the alternative visual can be used to localize a problem with a platform to a specific KPI being monitored.
Figure 4:
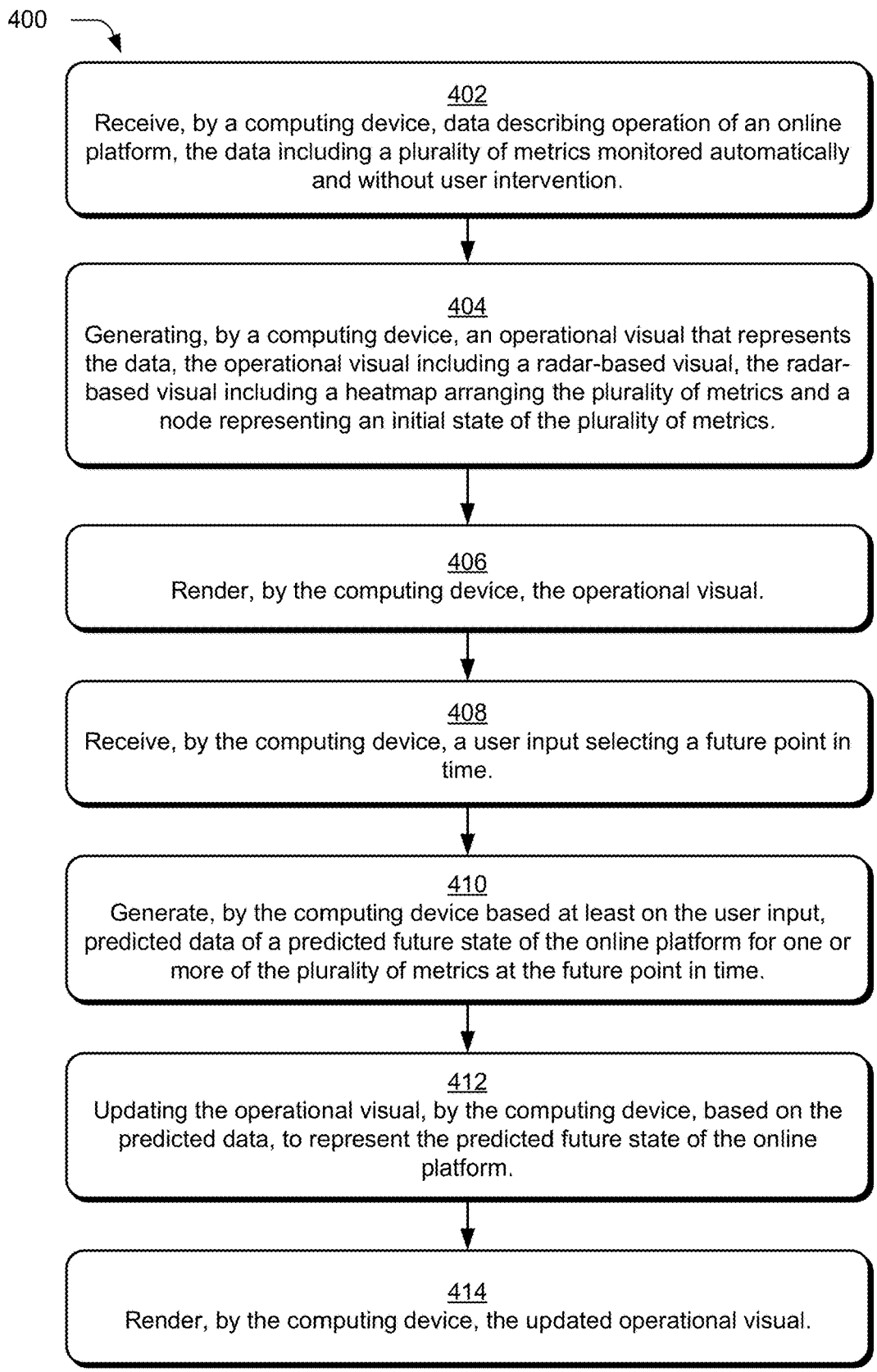
FIG. 4 is a flow diagram depicting a procedure in an example implementation wherein an operational visual is generated and rendered based on data describing operation of an online platform, predicted data of a predicted future state of the online platform is generated based on a selected simulation setting, and an updated operational visual is further generated and rendered based on the predicted data.
Figure 5:
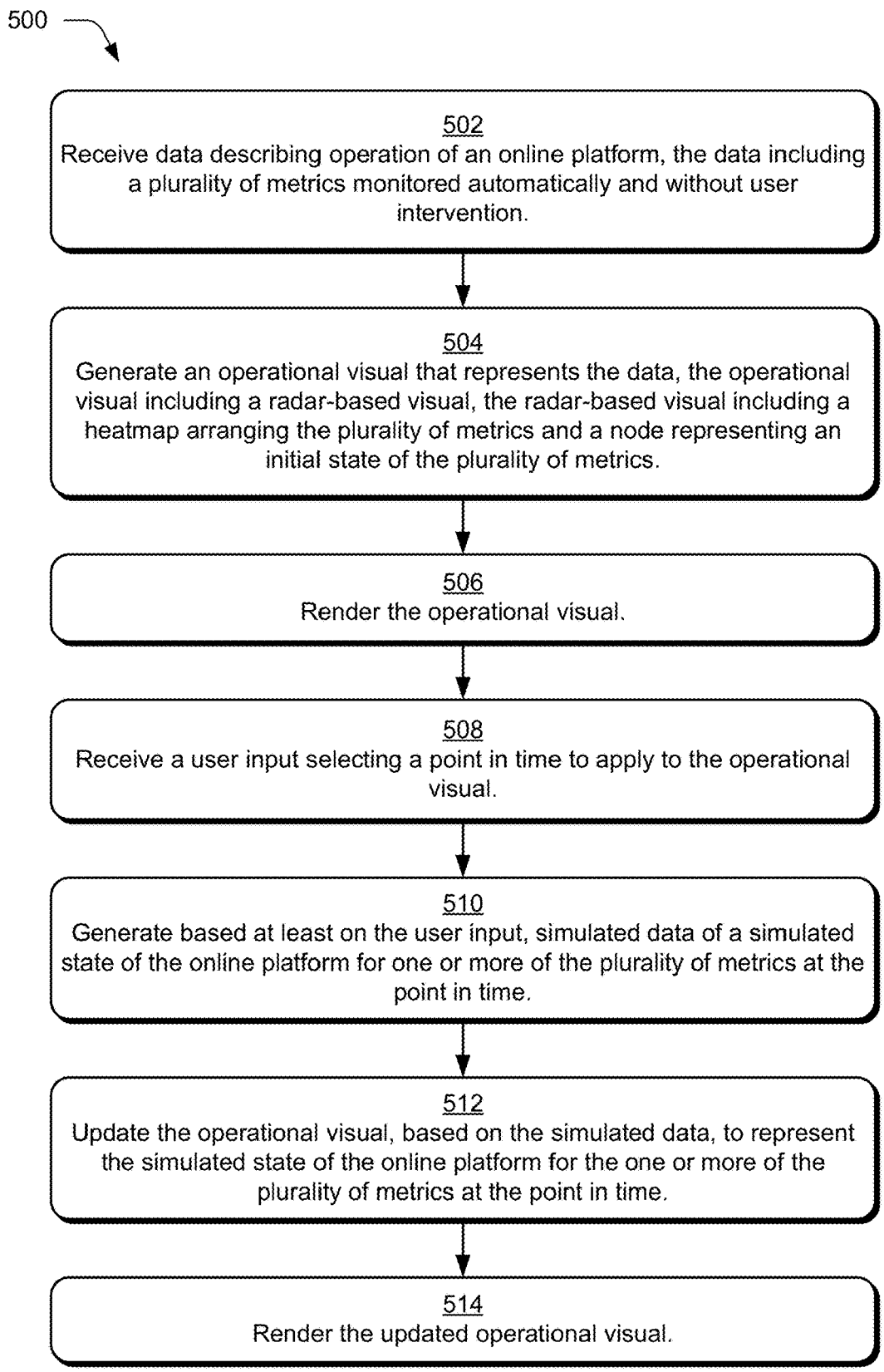
FIG. 5 is a flow diagram depicting a procedure in an example implementation wherein an operational visual is generated and rendered based on data describing operation of an online platform, simulated data of a simulated state of the online platform is generated based on a selected point in time, and an updated operational visual is further generated and rendered based on the simulated data.
Figure 6:
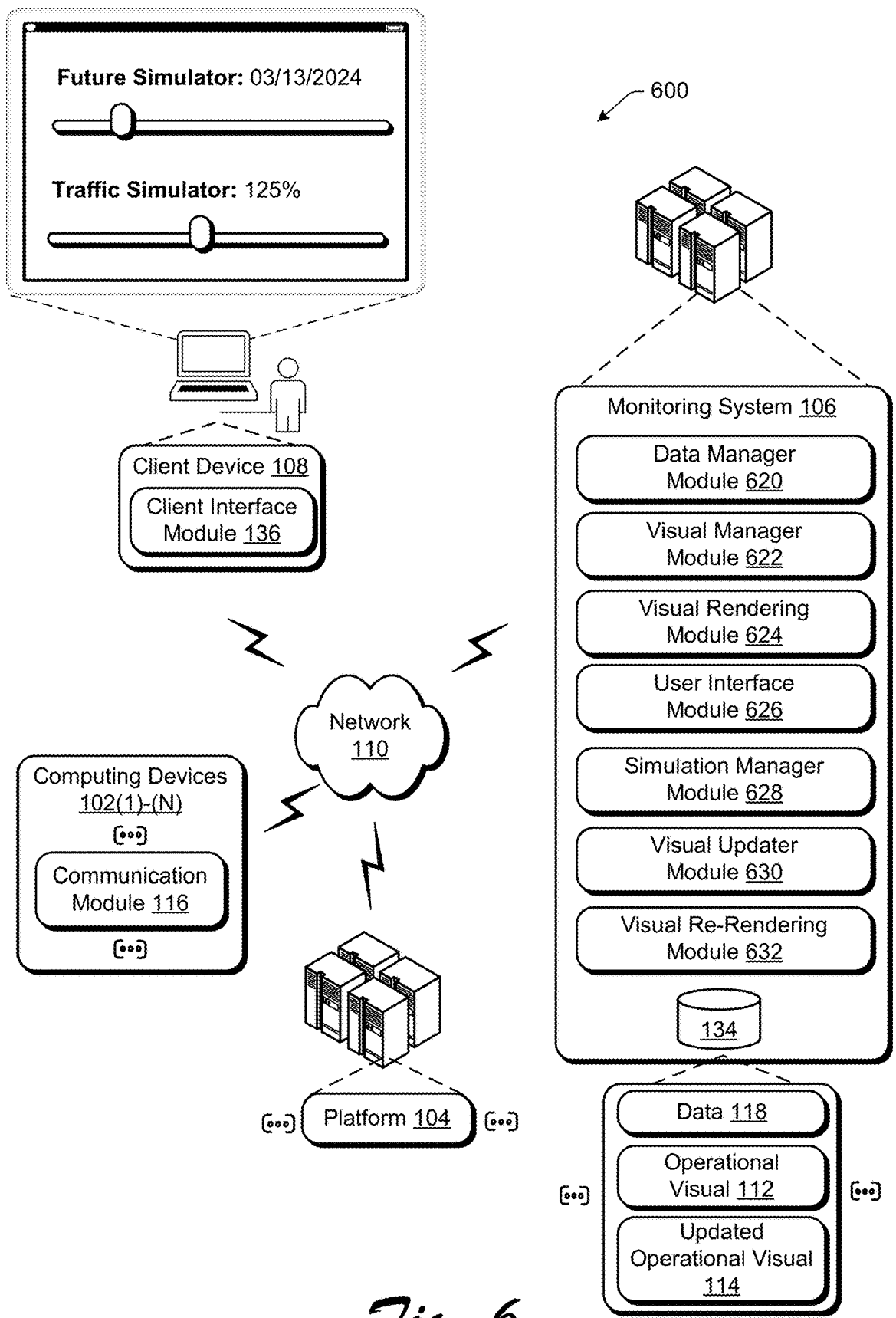
FIG. 6 depicts a system in an example implementation in which a client device receives, via a user interface displaying digital content, a user selection of a simulation setting.

FIG. 2A depicts a system 200 in an example implementation showing operation of a monitoring system of FIG. 1 in greater detail as generating and rendering an operational visual that represents data describing operation of an online platform, in addition to an updated operational visual based on a selected simulation setting. FIG. 2B depicts a diagram that illustrates a web diagram of system 200 and how the web diagram overlays an operational visual or an updated operational visual, and how the web diagram can be used to visualize a representation of the relationship between a selected node's KPI value compared with other KPIs for the same node on the operational visual or the updated operational visual. FIG. 2C depicts a diagram that illustrates an alternative visual (e.g., a "sunburst" visual) of system 200 that can be displayed on a user interface, and how the alternative visual can be used to localize a problem with a platform to a specific KPI being monitored. FIG. 3 depicts a procedure 300 in an example implementation in which an operational visual is generated and rendered based on data describing operation of an online platform, simulated data of a simulated state of the online platform is generated based on a selected simulation setting, and an updated operational visual is further generated and rendered based on the simulated data. FIG. 4 depicts a procedure 400 in an example implementation in which an operational visual is generated and rendered based on data describing operation of an online platform, predicted data of a predicted future state of the online platform is generated based on a selected simulation setting, and an updated operational visual is further generated and rendered based on the predicted data. FIG. 5 depicts a procedure 500 in an example implementation in which an operational visual is generated and rendered based on data describing operation of an online platform, simulated data of a simulated state of the online platform is generated based on a selected point in time, and an updated operational visual is further generated and rendered based on the simulated data. FIG. 6 depicts a system 600 in an example implementation in which a client device receives, via a user interface displaying digital content, a user selection of a simulation setting via a user input.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made interchangeably to FIGS. 2-6.

To begin this example, the data manager module 120 of the monitoring system 106 receives the data 118 describing operation of the platform 104, the data 118 including a plurality of metrics monitored automatically and without user intervention (blocks 302, 402, and 502). By way of example, the monitoring system may receive data associated with KPIs, wherein the metrics are monitored automatically and without user intervention. Next, the visual manager module 122 generates visual data 208 of the operational visual 112 that represents the data 118, the operational visual 112 including a radar-based visual 210 generated via a self-organizing radar (SOR) module 204, the radar-based visual 210 including a heatmap 212 arranging the plurality of metrics and a node 214 representing an initial state of the plurality of metrics (blocks 304, 404, and 504).

The visual manager module also includes a voting module 206, which may generate other visuals, such as tree map visuals (blocks 306, 406, and 506). A tree map visual can be generated via the voting module 206 by using a multi-agent voting system of various machine learning agents. In one implementation, an agent is a regression model coupled with a Quantile Loss Gradient Boosted Trees (QLGBT) machine learning model for vote-decision making. The system analyzes the metrics being monitored and determines which metrics are highly correlated to distribute on the agents. For instance, the system can use independent regressors to determine that a first metric and a second metric satisfy a correlation threshold, and therefore are highly correlated and can be assigned to one or more agents. If a first metric and a second metric are highly correlated, a data value for the first metric can be confidently used by an agent to predict a data value for the second metric using the agent's regression method of choice (e.g., polynomial regression).

Next, the visual rendering module 124 renders the operational visual 112; the visual rendering module 124 may render the operational visual 112 based on visual data 208 generated by the visual manager module 122, the operational visual 112 including the radar-based visual 210, the heatmap 212, and the node 214 (blocks 308, 408, and 508). Next, the user interface module 126 receives a user input 216 selecting a simulation setting (e.g., a point in time, a traffic load, and so forth) to apply to the operational visual 112 (blocks 310, 410, and 510). By way of example, the user input 216 may be received via an interactive slider to select a simulation setting, such as a traffic simulation setting of 125%. Such user input data 218 is received by the simulation manager module 128, which generates, based at least on the user input data 218, simulated data 220 of a simulated state of the online platform for one or more of the plurality of metrics under the simulation setting selected via the user input 216 (blocks 312, 412, and 512). The user input may be received through other recognized means, such as recognized gestures, utterances, clicking, tapping, passwords, communicative coupling, and so forth.

The monitoring system may be configured to control access to particular features based on the received data 202 and the simulated data 220. By way of example, when the received data 202 or the simulated data 220 indicates that particular metrics that are being monitored represent an unhealthy state of the platform 104, the monitoring system may automatically take actions to prevent a simulated or predicted future state of the system, such as preventing the addition of a new service or the removal of an old service, or by adding the addition of a new service and removing an old service based on an analysis of the received data 202 and the simulated data 220.

Next, a visual updater module 130 of the monitoring system 106 updates the operational visual 112, based on the simulated data 220 (e.g., predicted data), to represent the simulated state of the platform 104 (e.g., a predicted state of the platform), thus producing updated visual data 222 (blocks 312, 412, and 512). Finally, the visual re-rendering module 132 renders the updated operational visual 114 based on the updated visual data 222 of the initial operational visual 112 (blocks 314, 414, and 514), the updated operational visual 114 representing the simulated or predicted state of the platform 104 in view of the user input 216 and the user input data 218. The rendered updated operational visual 114 may be rendered as a two-dimensional image, as an augmented reality image, and so forth. After the updated operational visual 114 is rendered, it may continue to be updated, automatically, in real-time, similar to the initial operational visual 112.

In one implementation, as depicted by reference 224, a user can interact with the operational visual 112 or the updated operational visual 114 by selecting one of the displayed nodes 214 (e.g., providing user input to select an object representing a node 214(1) depicting a KPI 226(1) of a plurality of KPIs 224(1-N) for the node 214(1)). Responsive to the selection of a node 214(1), the operational visual 112 renders a web diagram 228 layered on top of the operational visual 112 or the radar-based visual 210 of the operational visual 112, the web diagram 228 representing the relationship between the node's 214(1) KPI value 226(1) compared with other KPIs 226 (e.g., KPI 226(N)) for the same node 214(1) on the operational visual 112 or the updated operational visual 114 (e.g., the relationship between 'memory use' and 'read and write speed' for a given node 214).

Figure 8:
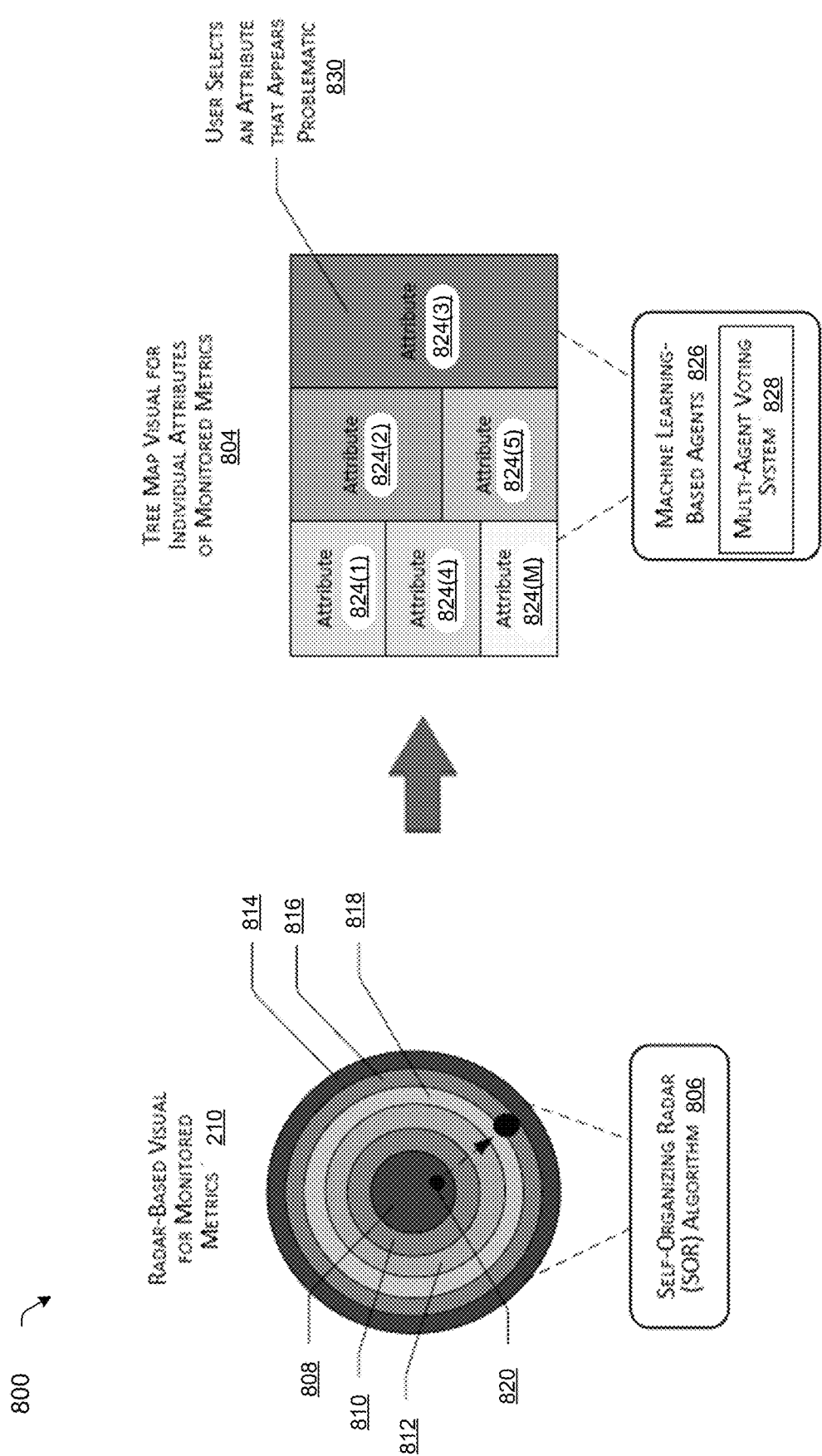
FIG. 8 is a diagram that illustrates a radar-based visual and a tree map visual that can be displayed on a user interface, and how the radar-based visual and the tree map visual can be used to localize a problem with a platform to a specific metric and/or a specific attribute being monitored.
Figure 9:
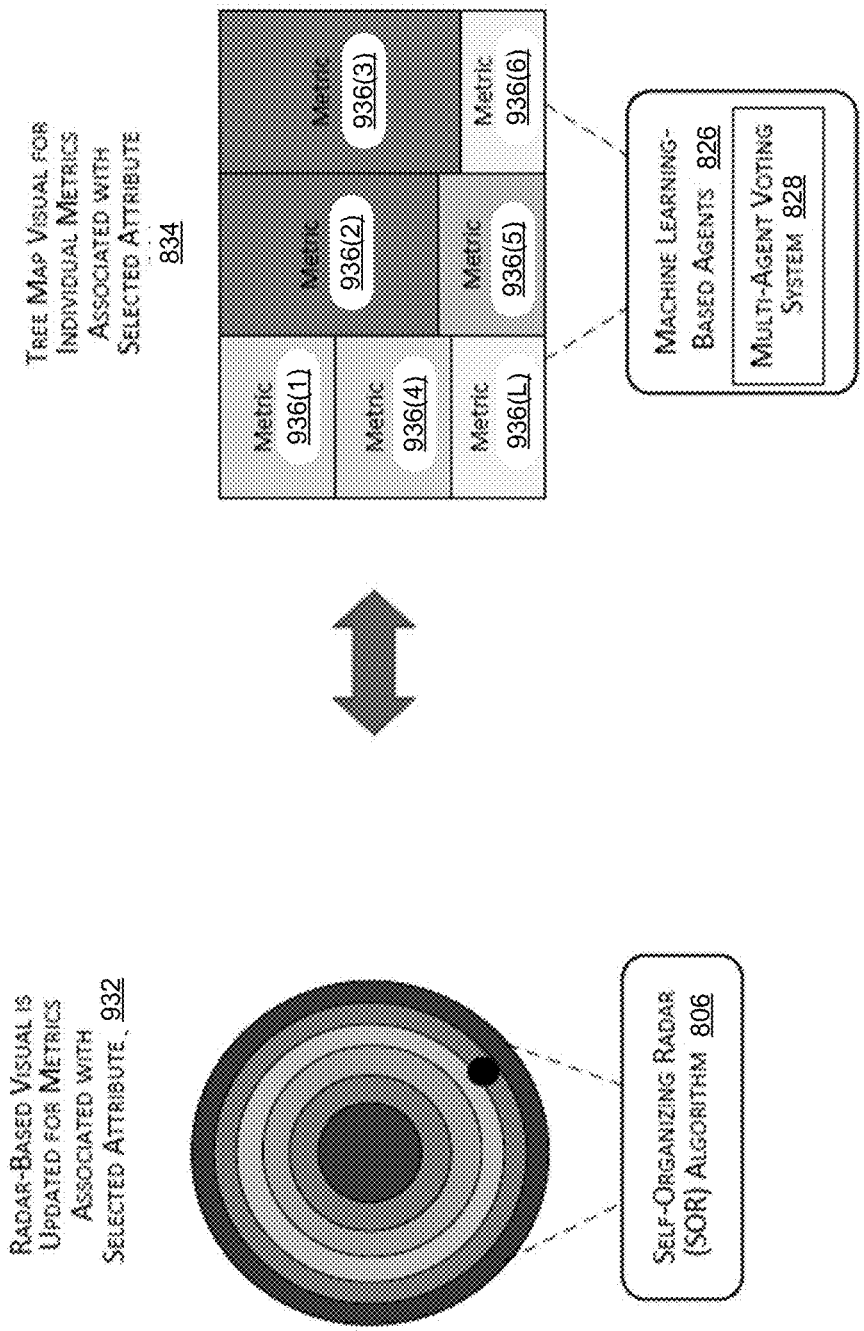
FIG. 9 is a diagram that illustrates a radar-based visual and a tree map visual that can be displayed on a user interface, and how the radar-based visual and the tree map visual can be updated based on a problem that is localized to a specific attribute.

In various examples, the operational visual 112 or the updated operational visual 114 may include a different visual, such as a tree map visual that includes a plurality of sections, as depicted by at least FIGS. 8 and 9, and further elaborated on in this application. Each section in the tree map visual, as depicted in at least FIGS. 8 and 9, can be associated with a specific attribute used to compose one or more of the metrics being monitored (e.g., KPIs 226). A size and/or a color of an individual section can be used to indicate anomalous activity for the specific attribute. That is, as an amount of anomalous activity grows, a size of a section will increase and the color may change (e.g., from green to yellow to red). In an example implementation, the different visual of the operational visual 112 or the updated operational visual 114 is an alternative visual 230 that is sectioned (e.g., like a pie chart), and each section 232(1-N) and 234(1-N) may be dynamically colored to reflect the overall system's performance with respect to one or more KPIs 226. As such, in one implementation, the sections' 232(1-N) and 234(1-N) colors, as rendered and/or displayed, may change in real-time as user input 216 is received (e.g., via an interactive slider to select a simulation setting).

As described above, a size and/or a color of an individual section in the alternative visual 230 can be used to indicate anomalous activity for a specific KPI. That is, as an amount of anomalous activity grows, a size of a section will increase and/or the color may change. Consequently, the alternative visual 230 can be used to localize a problem with a platform to a specific KPI being monitored.

Machine Learning-Based Interactive Visual Monitoring Ecosystem

Figure 7:
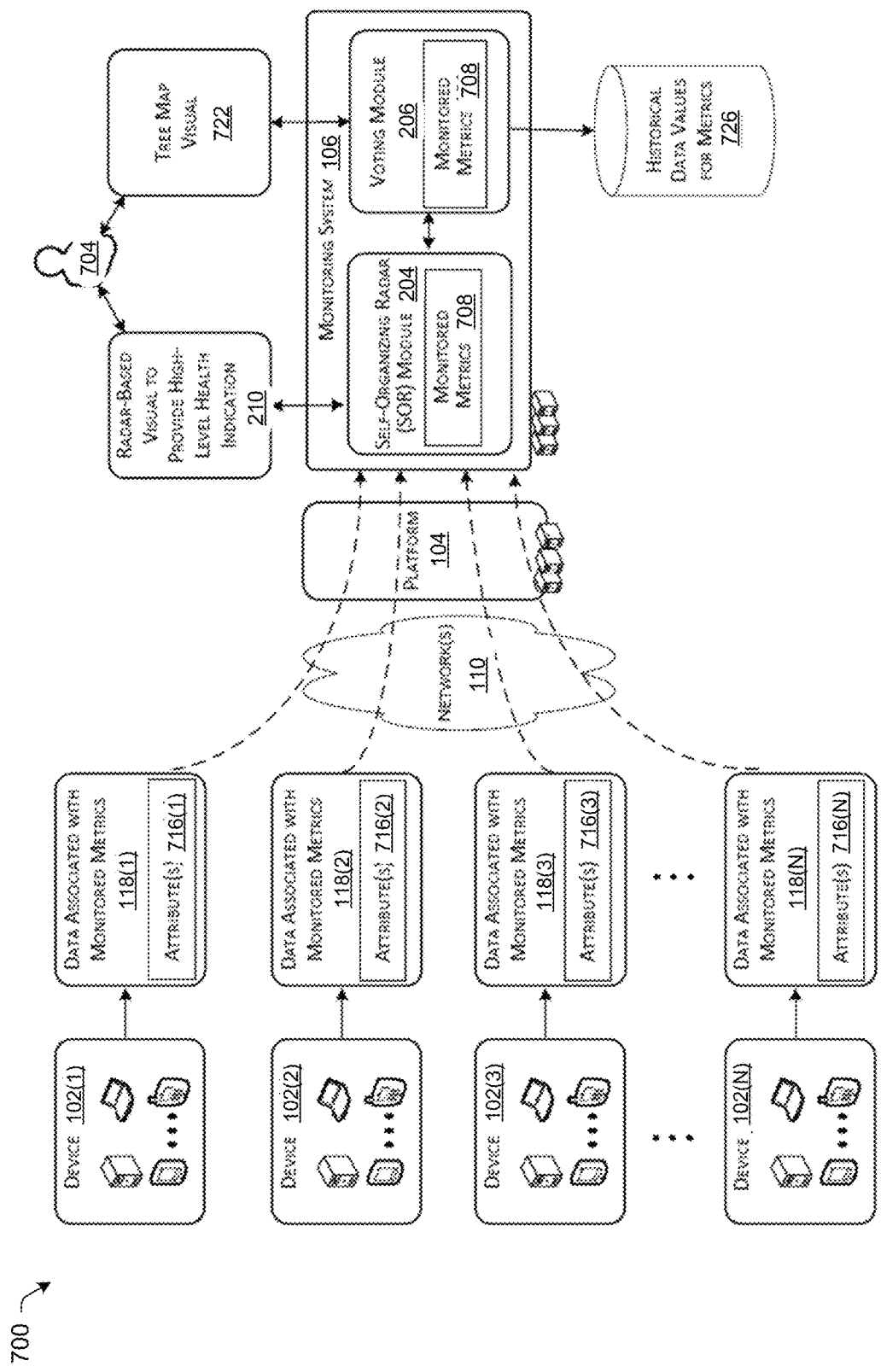
FIG. 7 is a diagram illustrating a machine learning-based interactive visual monitoring ecosystem in which a monitoring system is configured to display visuals so that a user can view a health indication for a platform and localize a problem to one or more metrics and/or attributes being monitored.

With reference now to the accompanying drawings, FIG. 7 illustrates, in block-diagram form, a machine learning-based interactive visual monitoring ecosystem 700 according to example implementations. Within the ecosystem 700, FIG. 7 is a diagram illustrating an example environment in which a monitoring system 106 is configured to display visuals so that a user 704 can view a health indication for a platform 104 and localize a problem to one or more metrics and/or attributes being monitored. In one configuration, the monitoring system 106 can be part of the platform 104. Alternatively, the monitoring system 106 can be a separate system that can be called upon by the platform 104 to implement the monitoring described herein.

In one example, the platform 104 can include resources (e.g., processing resources, networking resources, storage resources, etc.) that support a website, such as an electronic commerce site. Moreover, the user 704 may be part of a Site Reliability Engineering team tasked with monitoring hundreds or thousands of metrics 708, in real-time, in order to triage potential problems associated with the platform 104 and/or take appropriate remedial actions. The metrics 708 being monitored may relate to a particular function or process supported by the platform 104, such as the ability for customers to purchase items via an electronic commerce site.

While some of the examples described herein relate to health monitoring of a website such as an electronic commerce site, the techniques can additionally or alternatively be applied to other examples in which other metrics and/or other platforms are being monitored. For instance, the techniques described herein can be used to: display visuals representing active listings and market status for a seller of items (e.g., the user 704 in FIG. 7 can be a person that lists items on an electronic commerce site), to display visuals representing the segmentation of search results, or to display visuals representing a post-processing layer on top of a variety of possible artificial intelligence (AI) outputs.

FIG. 7 illustrates various devices 102 that may interact with the platform 104 to implement the particular function or process supported by the platform 104. The devices 102 are each configured to generate and send data 118 associated with the monitored metrics 708 to the platform 104 and/or the monitoring system 106. Accordingly, FIG. 7 illustrates that the devices 102 generate and send the data 118 associated with the monitored metrics 708 over one or more network(s) 110, and the data 118 is received by the monitoring system 106.

In various examples, the metrics 708 being monitored may belong to a category of metrics, such as checking out from an electronic commerce site (e.g., "checkout"). Accordingly, the category of metrics can be divided into multiple sub-category metrics (e.g., "checkouts_completed" and "checkouts_cancelled"). Moreover, a metric may include varying attributes. To this end, FIG. 7 illustrates that the data 118 associated with the monitored metrics 708 provided by the devices 102 can include attributes 716(1)-716(N) (may be referred to herein as data 118). The attributes 716 may relate to a location in which a customer is purchasing an item from a website, a type of device being used to purchase the item, a payment method being used to pay for the item, and so forth.

More specifically, the metrics 708 being monitored may be based on customers checking out and buying items in different countries, such as the United States of America, Great Britain, Australia, France, Russia, South Africa, Brazil, etc. The metrics 708 being monitored may be based on customers checking out and buying items using different types of devices, such as IPHONE devices, ANDROID devices, and/or other types of devices. The metrics 708 being monitored may be based on customers checking out, buying items, and paying for the items using different payment methods, such as PAYPAL, a credit card, and/or other types of payment methods. An individual metric 708 can include one or multiple attributes 716, and one varying attribute 716 may result in a different metric 708 being monitored. For example, the following are different "checkout" metrics that may be monitored:

- an "checkouts_completed_overall" metric (e.g., all checkouts implemented using the platform regardless of location, device, and payment method),
- a "checkouts_completed_USA_IPHONE_PAYPAL" metric,
- a "checkouts_completed_AUSTRALIA_IPHONE_PAYPAL" metric,
- a "checkouts_completed_USA_ANDROID_PAYPAL" metric,
- a "checkouts_completed_USA_IPHONE_creditcard" metric.

The monitoring system 106 can comprise device(s) (e.g., servers) and/or other components that communicate with one another, with the platform 104, and/or with the devices 102 via one or more network(s) 110. Moreover, the monitoring system 106 can include a self-organizing radar (SOR) module 204 and a voting module 206. The number of illustrated modules is just an example, and the number can vary higher or lower. That is, functionality described herein in association with the illustrated modules can be performed by a fewer number of modules or a larger number of modules on one device or spread across multiple devices.

Using the data 118 associated with the metrics 708 being monitored, the self-organizing radar (SOR) module 204 can be used to generate and display a radar-based visual 210 to provide a high-level indication of whether the platform 104 is healthy. A platform 104 may be healthy when the data values associated with the metrics 708 are not deviating from expected or predicted data values in a meaningful manner. The radar-based visual 210 can be updated in real-time as the data 118 associated with the metrics 708 continues to be received by the monitoring system 106 over time.

Using the data 118 associated with the metrics 708 being monitored, the voting module 206 can optionally be used to generate and display another detailed display, such as a tree map visual 722. The tree map visual 722 enables the user 704 to localize a problem to a smaller group of metrics 708 being monitored. Stated another way, the tree map visual 722 allows a user to determine which metrics, out of hundreds or thousands of metrics being monitored, are experiencing anomalous activity. As further described herein, the tree map visual 722 can be generated using a machine learning model built based on historical data values for the metrics 708. It is to be appreciated that the tree map visual 722 may be any other visual capable of displaying metrics, such as a detailed grid view, or other graphic.

By generating and displaying the visuals, such as visuals 210 and 722, the monitoring system 106 provides a real-time, interactive application where the user 704 can initially notice a problem using the radar-based visual 210, and then the user 704 can shift their focus to the tree map visual 722 to obtain a better understanding of the source of the problem. This is further described herein with respect to FIGS. 8 and 9.

Network(s) 110 can include, for example, public networks such as the Internet, private networks such as an institutional and/or personal intranet, or some combination of private and public networks. Network(s) 110 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 110 can utilize communications protocols, including packet-based and/or datagram-based protocols such as internet protocol (IP), transmission control protocol (TCP), user datagram protocol (UDP), or other types of protocols. Moreover, network(s) 110 can also include a number of devices that facilitate network communications and/or form a hardware basis for the networks, such as switches, routers, gateways, access points, firewalls, base stations, repeaters, backbone devices, and the like.

In various examples, device(s) of the monitoring system 106 can include one or more computing devices that operate in a cluster or other grouped configuration to share resources, balance load, increase performance, provide fail-over support or redundancy, or for other purposes. For instance, device(s) of the monitoring system 106 can belong to a variety of classes of devices such as traditional server-type devices.

A device 102 can belong to a variety of classes of devices, such as server-type devices, desktop computer-type devices, mobile-type devices, special purpose-type devices, embedded-type devices, and/or wearable-type devices. Thus, a device 102 can include, but is not limited to, a desktop computer, a game console and/or a gaming device, a tablet computer, a personal data assistant (PDA), a mobile phone/tablet hybrid, a laptop computer, a telecommunication device, a wearable device, a virtual reality (VR) device, an augmented reality (AR) device, an automotive computer, a network-enabled television, a terminal, an Internet of Things (IoT) device, a work station, a media player, a personal video recorders (PVR), a set-top box, or any other sort of computing device.

Turning now to FIG. 8, FIG. 8 is a diagram that illustrates a radar-based visual 210 and a tree map visual 722, and how the radar-based visual 210 and the tree map visual 722 can be used to localize a problem to a specific metric being monitored.

The radar-based visual 210 is configured to plot objects based on the data 118 received in association with the metrics 708 being monitored. In one implementation, the radar-based visual 210 can be generated using an unsupervised artificial neural network algorithm that projects high-dimensional data onto a two-dimensional map. In one configuration, the radar-based visual 210 can be generated using a modified version of the "self-organizing map" (SOM) algorithm (i.e., "Kohonen's network"). The SOM algorithm achieves low-dimensional views of high-dimensional data. For example, high-dimensional data can be mapped into a two-dimensional data matrix using the algorithm and then the two-dimensional data matrix can be visualized as a heatmap, table, or other visualization. The modified version of the SOM algorithm accounts for time-series data and alters the output representation so that a symmetric radar-based visual is displayed, and thus, may be referred to as a "self-organizing radar" (SOR) algorithm 806.

In some implementations, the SOR algorithm 806 is adjusted to accommodate time-based expectations for the monitored metrics. Stated another way, separate SOR algorithms 806 can be used for different predetermined time periods. For instance, the SOR algorithm 806 can include adjustments for each hour of each day of a particular week in a year. This accounts for daily and/or seasonal expectations. In further implementations, the SOR algorithm 806 can be updated over time to reflect trends in the metrics being monitored.

The radar-based visual 210 can include different color and/or shaded regions to help signal a problem. For example, the inner part of the radar-based visual 210 around a center point can include regions 808, 810, 812 represented by different shades of a color, such as blue. Region 808 may be a darker shade of blue, which indicates a strong signal of normal activity, while region 812 may be a lighter shade of blue indicating a weaker signal of normal activity. Region 810 may be a shade of blue between the darker shade and the lighter shade.

The outer part of the radar-based visual 210 can include regions 814, 816, 818 represented by different shades of another color, such as red. Region 814 may be a darker shade of red, which indicates a strong signal of anomalous activity, while region 818 may be a lighter shade of red indicating a weaker signal of anomalous activity. Region 816 may be a shade of red between the darker shade and the lighter shade.

An object 820 (e.g., a dot) plotted on the radar-based visual 210 can represent a combination of metrics related to an aspect of the platform 104 being monitored. For instance, the combination of metrics may relate to a "checkouts_completed" category or sub-category, and the individual metrics in the combination may have varying attributes (e.g., different locations, different devices, different payment methods). The way in which the radar-based visual 210 is configured for display enables the object 820 to signal anomalous activity associated with the combination of metrics as the plotted location of the object moves toward the periphery of the radar-based visual 210 over time. For example, if the object 820 moves from the shown location in region 808, to the location in region 816, then this movement signals growing anomalous activity within the combination of metrics. In contrast, if the plotted location of the object 820 remains towards the center of the radar-based visual 210 (within region 808), then the plotted location of the object 820 signals normal activity associated with the combination of metrics. It is to be appreciated that the radar-based visual 210 may display more than one object concurrently.

In some implementations, a size of the object (e.g., the size of a dot) can increase as the object moves through regions near the center of the radar-based visual 210 towards regions near the periphery of the radar-based visual 210. This is illustrated by the size of the object 820 when it is located in region 808 compared to the size of the object after it has moved to region 816. The size dimension of an object may help determine whether anomalous activity is due to a potentially normal but less frequent event, such as a peak demand period, promotion, or holiday, or may be due to activity that has not been observed before. In other words, the size of an object may indicate how elevated or different the object is from a specific region on the radar-based visual. An elevated object may mean that the radar has rarely or never seen such behavior when it was being trained.

Therefore, a size of the object 820 can represent a degree to which the real-time data for the combination of metrics is anomalous to the observed historic data. It is possible that the object may be located near the center of the radar-based visual, yet one or more of the real-time metric values is foreign and is not commonly seen in the historical data. In a specific example, a large number of metrics being monitored may have normal values that closely match historical observations, but a small number of metrics (e.g., one, two, three, etc.) being monitored may have real-time values that are not commonly observed or that have never been observed before (e.g., foreign values). In this situation, the increased size of the object can be used to signal the anomaly because the location of the object is likely to be plotted towards the center of the radar-based visual due to the normal observations of the larger number of metrics.

A user can notice when the object starts to move from the blue regions 808, 810, 812 near the center of the radar-based visual 210 towards the red regions 814, 816, 818 near the periphery of the radar-based visual 210. Consequently, the movement, or lack thereof, provides an indication of the health of the platform 104. It is understood, in the context of this disclosure, that the radar-based visual 210 can be segmented to display multiple different objects representing different combinations of metrics simultaneously. Alternatively, the radar-based visual 210 can display objects generated at different time frames on segments associated with these time-frames. Furthermore, the radar-based visual 210 can be segmented to show and compare or contrast different domains on the same radar, such as the business-aspect domain on one half of the visual compared to the infrastructure domain on the second half, or the health of one data-center in contrast with the health of another data-center.

The tree map visual 804 includes a plurality of sections, and each section in the tree map visual 804 can be associated with a specific attribute 824(1)-824(M) used to compose one or more of the metrics being monitored (where M in the context of FIG. 8 is a positive integer number that can be hundreds, thousands, etc.). A size and/or a color of an individual section can be used to indicate anomalous activity for the specific attribute 824(1)-824(M). That is, as an amount of anomalous activity grows, a size of a section will increase and the color may change (e.g., from green to yellow to red).

As described above, a specific attribute 824(1)-824(M) may be a location of multiple different locations from which customers can purchase an item via an electronic commerce site and supporting platform (e.g., the United States of America, Great Britain, Australia, France, Russia, South Africa, Brazil, etc.), a type of device of multiple different types of devices that can be used by customers to purchase an item via the electronic commerce site and supporting platform (e.g., IPHONE, ANDROID, etc.), a payment method of multiple different payments methods that customers can use to purchase an item via the electronic commerce site and supporting platform (e.g., PAYPAL, credit card, etc.), and so forth.

The tree map visual 804 can be generated using machine learning-based agents 826 (e.g., hundreds of agents, thousands of agents, etc.) that constitute a multi-agent voting system 828. In one implementation, a machine learning-based agent 826 can include a polynomial regression model coupled with a Quantile Loss Gradient Boosted Trees (QLGBT) machine learning model. The monitoring system 106 is configured to analyze the metrics being monitored and determine which metrics are highly correlated to distribute amongst the agents 826. The monitoring system 106 may ultimately determine hundreds or thousands of correlations between the metrics being monitored. For instance, independent regressors can be used to determine that a first metric and a second metric satisfy a correlation threshold, and therefore are highly correlated. If a first metric and a second metric are highly correlated, the assigned agent can confidently predict a data value for the second metric from the first metric. In a more specific example, an analysis of the historic data values 726 may yield a correlation in which a data value for a "checkouts_completed" metric can be used to predict a data value for a "checkouts_cancelled" metric. In another specific example, a historic analysis of data values can be used to identify a correlation in which a data value for a "checkouts_completed_France" metric can be used to predict a data value for a "checkouts_completed_overall" metric.

Given two highly correlated metrics, an agent 826 generates a prediction model so that a data value of a first metric can predict a data value for a second metric. A prediction model can be generated for each set of highly correlated metrics by multiple different agents. Provided an actual data value for a particular metric, an agent is configured to compare the actual data value to the data values predicted by the agent's prediction model generated in association with the particular metric. The agent then uses its own prediction error and/or other exogenous factors, such as temporal factors, holiday factors, etc., to generate upper and lower quantile limits (i.e., bounds) on the error using QLGBT. Other mechanisms, such as a Quantile Loss Deep Neural Network (QL-DNN), can be used to generate the upper and lower bounds as well. If the error in a predicted data value falls outside a confidence interval when compared to the actual data value, then the agent provides a vote that signals an anomaly. In other words, a vote by an agent means that an error in predicting a data value for a metric was outside an acceptable error range. In various examples, the error is a normalized error (e.g., a percentage) that is agnostic to the scale of the data. In other examples, the error may be an absolute error.

The vote is associated with a particular metric based on whether the error falls outside the upper bound or the lower bound. For example, a first correlated metric may be associated with the upper bound and a second correlated metric may be associated with the lower bound. The agent may use this approach when an anomaly is associated with a decrease in values (e.g., a dip). If the error in predicting the data value is outside the upper bound, the first correlated metric receives the vote and is therefore the voted metric. If the error in predicting the data value is outside the lower bound, the second correlated metric receives the vote and is therefore the voted metric. In another example, the first correlated metric may be associated with the lower bound and the second correlated metric may be associated with the upper bound. The agent may use this approach when an anomaly is associated with an increase in values (e.g., a spike).

Once the votes are received, the voting module 206 can analyze the agents assigned to the voted metric, and localize a problem to a specific attribute. For instance, the voting module 206 can examine the agents 826 to determine a total number of agents that share an attribute (e.g., a location such as the United States of America) with the voted metric, without regard to whether the agent voted or not. The voting module 206 also determines a number of voting agents that share the same attribute (e.g., a location such as the United States of America).

If a percentage determined based on the number of the voting agents that share the attribute and the total number of agents that share the same attribute is greater than a predetermined threshold percentage (e.g., a percentage between seventy and ninety percent), then the system can determine that the problem is likely localized to that attribute. In a specific example, a threshold can be set to seventy-five percent, and thus, if eighty out of a total of one hundred agents that use a metric related to the United States of America attribute provide a vote signaling an anomaly, then the system can localize a problem to a specific location, i.e., the United States of America.

Further, the voting module 206 can use this information in the tree map visual 804 to show a user that there may be a problem with respect to a particular attribute, such as the United States of America. For example, a size of a section can increase and/or a color of the section can change based on the percentage determined based on the number of the voting agents that share the attribute and the total number of agents that share the attribute and/or based on whether the percentage exceeds the predetermined threshold percentage.

In the example of FIG. 8, the section representing attribute 824(3) has an increased size and/or a different color, and thus, attribute 824(3) is likely associated with anomalous activity. Accordingly, the user may select attribute 824(3) in order to better understand the problem, as referenced by 830.

Based on the user selection, both the radar-based visual and the tree map visual can be updated and/or rebuilt using data associated with the metrics that include attribute 824 (3), as referenced by 832 and 834 in FIG. 9. For example, if attribute 824(3) relates to the United States of America, then the radar-based visual is re-generated by the self-organizing radar (SOR) algorithm 806 using metrics that include the United States of America as an attribute. Moreover, the tree map visual is updated to display sections representing the metrics 836(1)-836(L) (where L in the context of FIG. 9 is a positive integer number) that include the United States of America as an attribute. In this way, the user can dig deeper to see where a problem is located (e.g., with regard to metric 836(2) and/or 836(3)).

In some examples, the object on the radar-based visual will not change locations when the radar-based visual is updated, but rather the background colored regions are redistributed. However, in other examples, the background colored regions can remain static and the object can change locations (e.g., the object is replotted).

Figure 10:
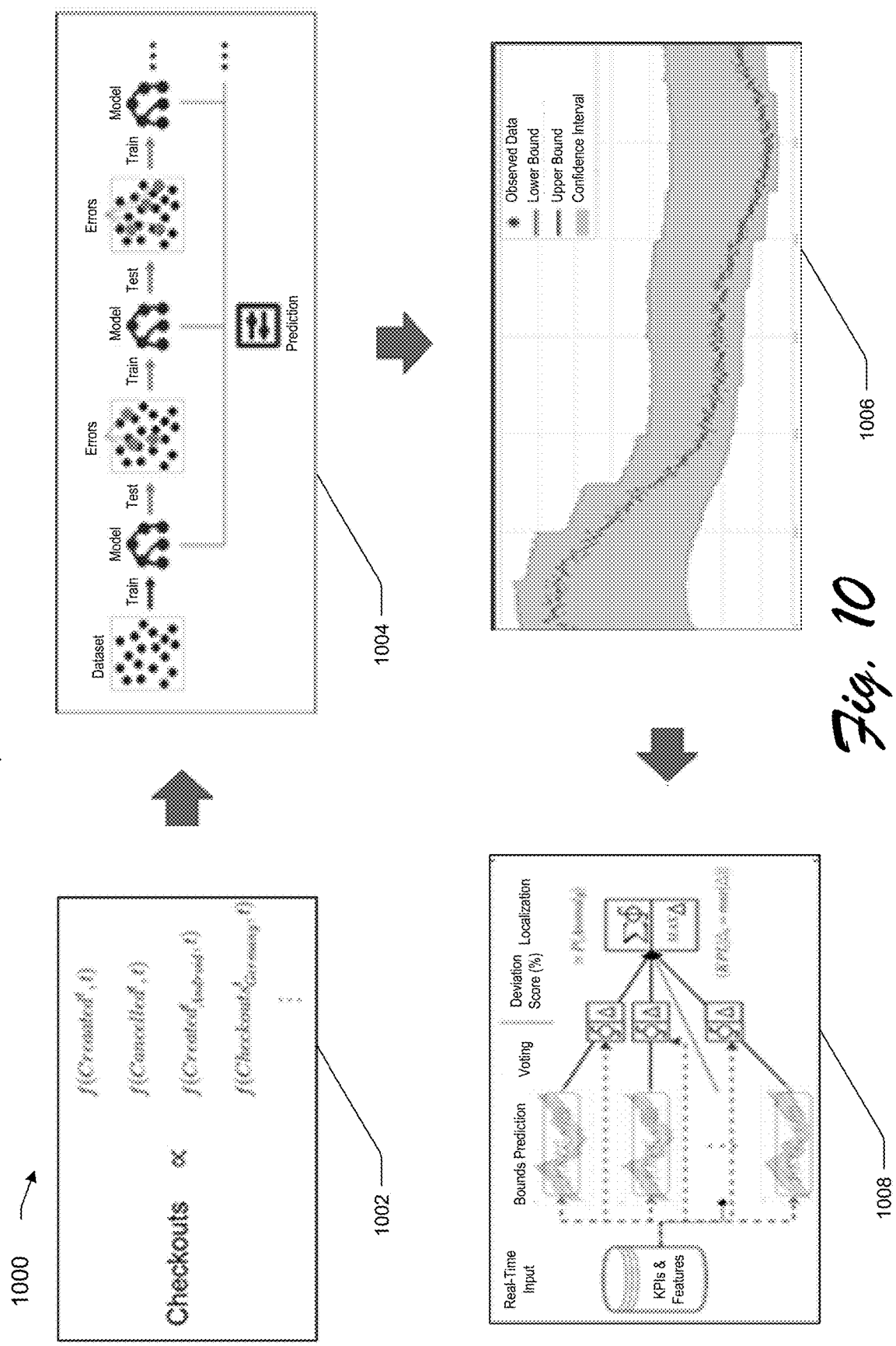
FIG. 10 illustrates an example of how the Quantile Loss Gradient Boosted Trees (QLGBT) model-based multi-agent system can be used to produce information to be represented via the tree map visual.

FIG. 10 illustrates the use of the Quantile Loss Gradient Boosted Trees (QLGBT) model-based multi-agent system that can be used to generate a tree map visual. For each category of metric (e.g., checkouts), a set of highly correlated metrics as independent regressors is determined. For each correlated pair of metrics, a time-independent generalized linear model (GLM) with polynomial relationships is fitted, as referenced by 1002. Models other than a generalized linear model can be used as well.

Using the regression error as a target along with temporal and exogenous variables, two gradient boosted tree (GBT) models are fitted around the prediction error, an example of which is referenced by 1004. One gradient boosted tree (GBT) model can correspond to an upper bound and another gradient boosted tree (GBT) model can correspond to a lower bound.

Using the gradient of a quantile loss/objective function in the boosting process, intervals on the predicted error are obtained. The end result is a pipeline that provides thresholds on the error, which is calculated from the predicted data value for the metric compared to the actual data value for the metric, as referenced by 1006. This process may be referred to as Dynamic Error Thresholding. This result is obtained for a large number (e.g., hundreds) of models utilizing correlated pairs of metrics.

A single agent can be the implementation of a correlated pair of metrics, the attributes of the metrics, the polynomial regression model(s), and the corresponding QLGBT models (or QL-DNN models) which drives the agent's decision. The agent's decision objective is whether to vote and which metric from the pair of metrics to vote for as being anomalous.

Votes are then collected from the agents. When an agent votes, it means that the error in predicting a data value for a metric was outside a permissible error range. As referenced by 1008, the problem can be localized by comparing a number of voting agents that share an attribute to a total number of agents that share the attribute. The comparison yields a percentage, and as the percentage increases, a likelihood that a problem is localized to the attribute also increases.

FIG. 11A is a diagram that illustrates an example of how a user can use the radar-based visual to view information associated with monitored metrics rather than a large number of charts, where each chart is associated with an individual metric. Reference 1102 shows that a user, such as a Site Reliability Engineer, typically has to view a user interface with a large number of charts. Each chart represents a single metric being monitored, and thus, a user responsible for monitoring a large number of metrics (e.g., hundreds) finds herself or himself switching between charts and/or different screens when attempting to identify a problem.

Reference 1100 illustrates a more effective data visualization approach, in the form of a radar-based visual 210, that can showcase a large number (e.g., hundreds) of metrics at once. The radar-based visual 210 is able to tell a viewer whether or not a problem is happening within some collection of metrics by plotting objects, where the location of an object provides an indication of the health of the platform being monitored. This is a large improvement over conventional methods, where a user has to view a large number of graphs for a large number of metrics.

Figure 11B:
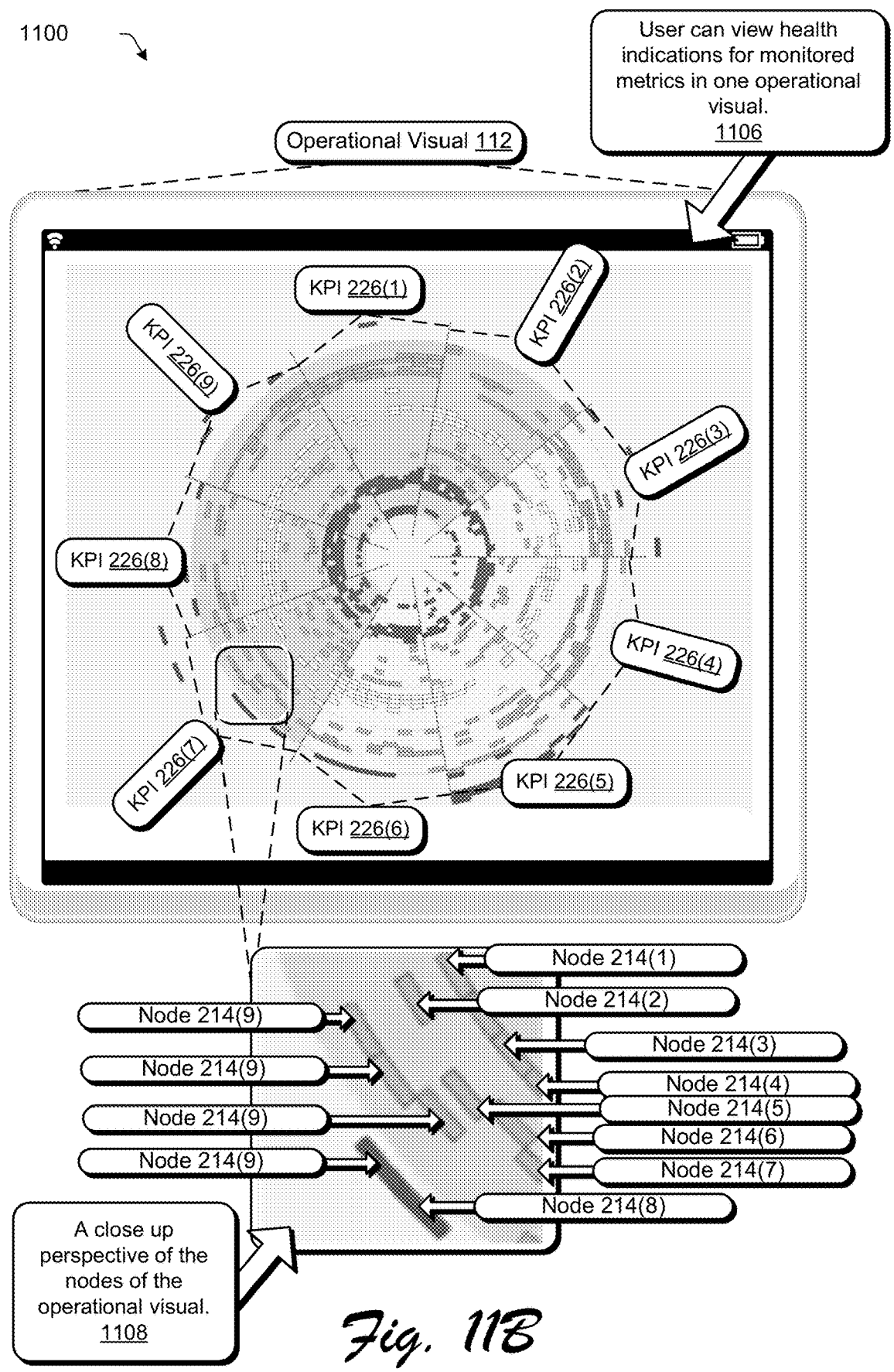
FIG. 11B is a diagram that illustrates an example of how a user can use the operational visual to view information associated with monitored metrics (e.g., KPIs) rather than a large number of charts, where each chart is associated with an individual metric.

FIG. 11B is a diagram that illustrates an example of how a user can use the operational visual 112 to view information associated with monitored metrics (e.g., KPIs 226) rather than a large number of charts, where each chart is associated with an individual metric. Reference 1106 illustrates a more effective data visualization approach, in the form of the operational visual 112, that can showcase a large number (e.g., hundreds) of metrics at once. In the illustrated reference 1106, the metrics are KPIs 226. The operational visual 112 is able to tell a viewer whether or not a problem is happening within some collection of metrics by plotting objects, where the location of an object provides an indication of the health of the platform being monitored. In references 1106 and 1108, the objects represent nodes 214. Users may also use the updated operational visual 114 to view information associated with monitored metrics (e.g., KPIs 226) rather than a large number of charts, where each chart is associated with an individual metric.

Figure 12:
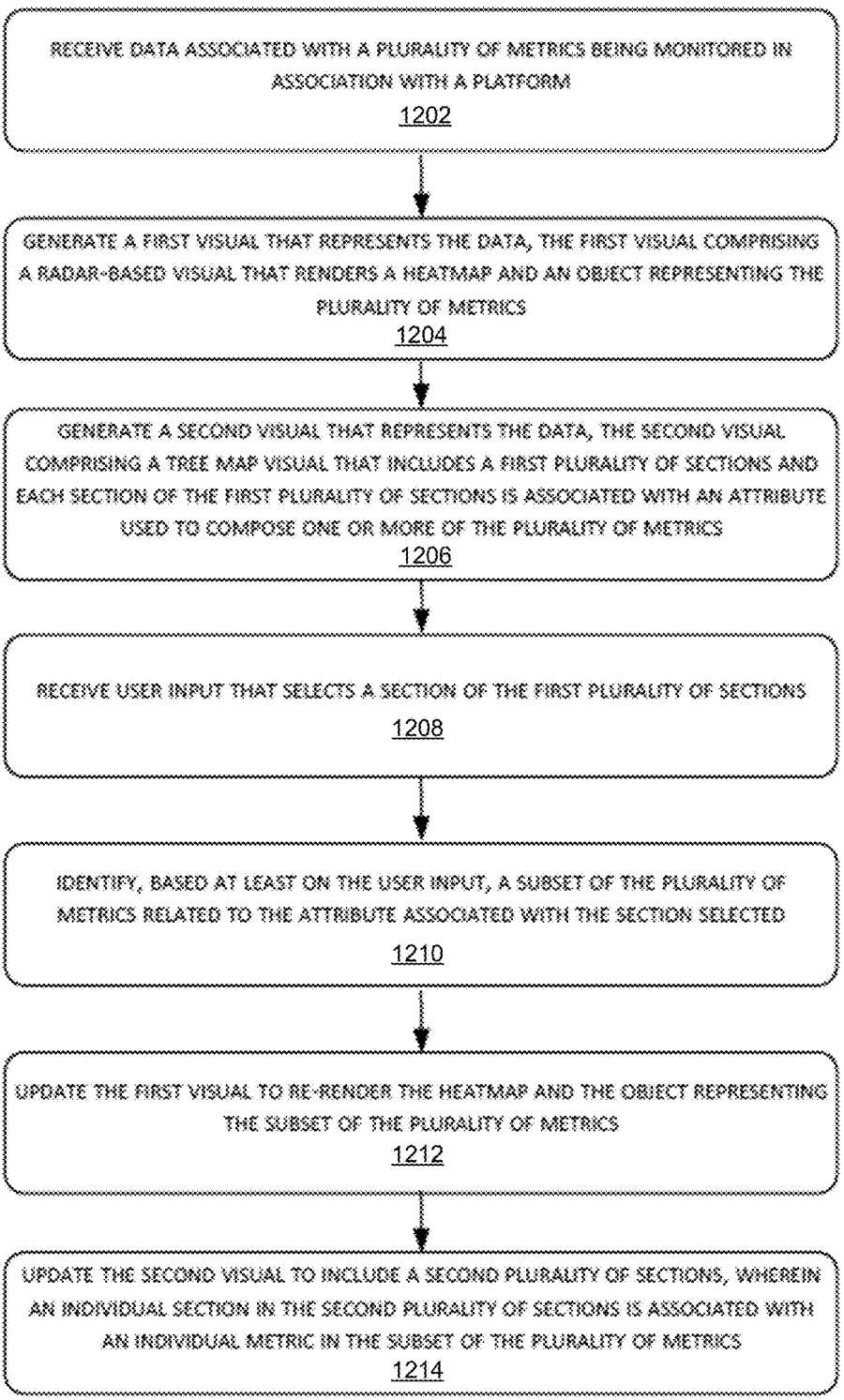
FIG. 12 is a flow diagram showing aspects of an illustrative method, according to one implementation disclosed herein.
Figure 13A:
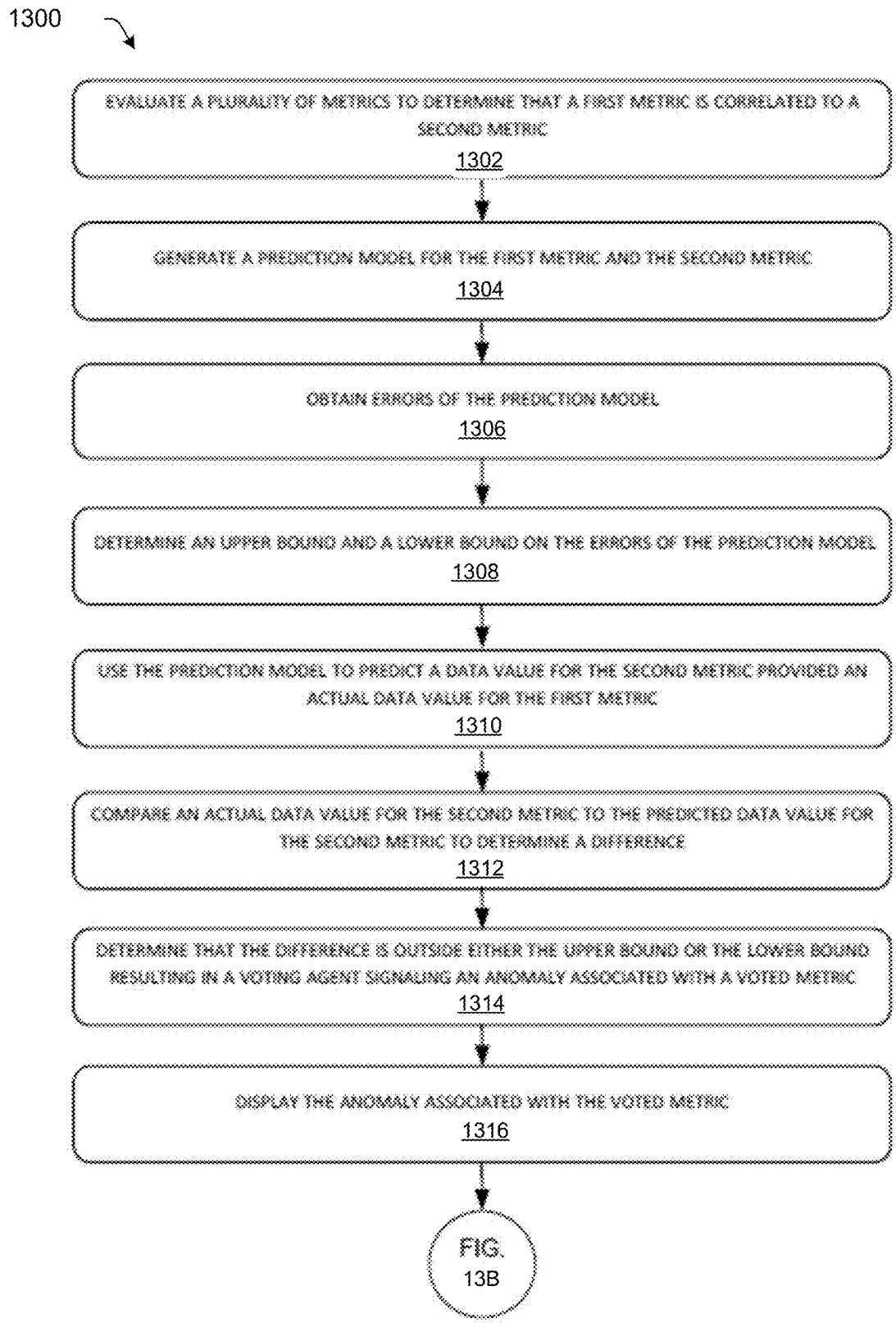

FIGS. 12 and 13A-13B are diagrams illustrating aspects of methods 1200 and 1300 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-readable storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example methods described below are operating on a computing device, it can be appreciated that these methods can be performed on any computing system which may include a number of computing devices (e.g., servers) working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The method 1200 begins at operation 1202, which illustrates receiving data associated with a plurality of metrics being monitored in association with a platform. For example, the metrics being monitored may relate to a particular function or process of the platform, such as the ability for customers to purchase items via an electronic commerce site. In a more specific example, the metrics being monitored may relate to one or more of a customer being able to sign in, a customer being able to check out, and so forth.

Operation 1204 illustrates generating a first visual that represents the data. As described above, the first visual can include a radar-based visual that renders a heatmap and an object representing the plurality of metrics. The radar-based visual can provide a high-level indication of whether the platform is healthy based on the plurality of metrics. That is, movement of the object within the radar-based visual can signal normal activity or abnormal activity with respect to the plurality of metrics. Additionally or alternatively, a size of the object can signal normal activity or abnormal activity with respect to the plurality of metrics.

Operation 1206 illustrates generating a second visual that represents the data. The second visual can include a tree map visual that includes a first plurality of sections and each section of the first plurality of sections is associated with an attribute used to compose one or more of the plurality of metrics. As described in examples above, an attribute can relate to a location, a type of device, a type of payment method, and so forth.

Operation 1208 illustrates receiving user input that selects a section of the first plurality of sections. The user input may be provided in order to help a user attempt to localize a potential problem to a particular metric and/or a particular attribute.

Operation 1210 illustrates identifying, based at least on the user input, a subset of the plurality of metrics related to the attribute associated with the section selected.

Operation 1212 illustrates updating the first visual to re-render the heatmap and the object representing the subset of the plurality of metrics. This updated first visual can provide the user with a high-level indication of whether the platform is experiencing anomalous activity with respect to the subset of the plurality of metrics.

Operation 1214 illustrates updating the second visual to include a second plurality of sections. An individual section in the second plurality of sections is associated with an individual metric in the subset of the plurality of metrics.

Switching to FIGS. 13A-13B, the method 1300 begins at operation 1302, which illustrates evaluating a plurality of metrics to determine that a first metric is correlated to a second metric. Accordingly, this evaluation operation may yield a set of correlated metrics for a particular function or process the platform implements (e.g., checkouts).

Operation 1304 illustrates generating a prediction model for the first metric and the second metric. Provided an actual data value for a first metric, the prediction model is configured to predict a data value for the second metric.

Operation 1306 illustrates obtaining errors of the prediction model. In some examples, exogenous variables can be used to obtain the errors.

Operation 1308 determines an upper bound and a lower bound on the errors of the prediction model. In one example, the upper bound and the lower bound are determined using Quantile-Loss Gradient Boosted Tree error threshold models. The upper bound may be associated with the first metric and the lower bound may be associated with the second metric. Alternatively, the upper bound may be associated with the second metric and the lower bound may be associated with the first metric.

Operation 1310 illustrates using the prediction model to predict a data value for the second metric provided an actual data value for the first metric.

Operation 1312 illustrates comparing an actual data value for the second metric to the predicted data value for the second metric to determine a difference.

Operation 1314 illustrates determining that the difference is outside either the upper bound or the lower bound. When the difference is outside the upper bound, an agent associated with the prediction model provides a vote signaling an anomaly associated with the first metric or the second metric, whichever one is associated with the upper bound. That is, the agent is a voting agent and the metric for which an anomaly is signaled is a voted metric. When the difference is outside the lower bound, an agent associated with the prediction model provides a vote signaling an anomaly associated with the other one of the first metric or the second metric. That is, the agent is still the voting agent but the other metric for which the anomaly is signaled is the voted metric. In the example described above, an agent can provide three possible decision outputs: a vote for a first metric, a vote for a second metric, or a vote is not provided.

Operation 1316 illustrates that the anomaly associated with the voted metric is displayed. For example, the vote signaling the anomaly can be used as a basis to generate the radar-based visual and/or the tree map visual.

The following operations in FIG. 13B can be used to determine whether a problem is likely localized to a particular attribute included in the voted metric and/or to alter the displayed visuals based on the determination.

Operation 1320 illustrates determining a total number of agents that have a metric that shares a particular attribute with the voted metric.

Operation 1322 illustrates identifying a number of voting agents, from the total number of agents, that provided a vote signaling anomalous activity.

Operation 1324 illustrates generating a percentage for the particular attribute based on the number of voting agents and the total number of agents.

Operation 1326 illustrates determining whether the percentage exceeds a threshold percentage (e.g., a percentage between seventy and ninety percent).

Operation 1328 illustrates determining whether a problem is localized to the particular attribute based on the determining whether the percentage exceeds the threshold percentage. For instance, if the generated percentage meets or exceeds the threshold percentage, a problem is likely associated with the particular attribute. If the generated percentage is less than the threshold percentage, a problem is not likely associated with the particular attribute (e.g., the voting agent may have identified an outlier instance).

Operations 1320 through 1328 may be repeated for each of the attributes included in a voted metric, so that a problem can be localized to an attribute that is likely causing the problem.

FIG. 14 is a diagram 1400 that illustrates a radar-based visual and a tree map visual that can be displayed on a user interface, and how user input (e.g., a hover input associated with the object on the radar-based visual and/or a section of the tree map visual) can be provided to view metadata. For ease of discussion, FIG. 14 reproduces the content described above with respect to FIG. 9.

As shown, a user such as a Site Reliability Engineer can interact with the radar-based visual and/or the tree map visual to glean more information about the metrics and/or attributes being monitored. For instance, the interaction can include an input 1402 that hovers over the object (e.g., the dot) plotted on the radar-based visual. Based on the input 1402, metadata 1404 that further describes the underlying data associated with the metrics represented by the object can be displayed. In one example, the metadata 1404 can identify one or more metrics that include the largest percentage of votes from agents. Consequently, these metric(s) are likely ones contributing to a problem (e.g., a slow bleed anomaly) with the platform being monitored. In another example, the metadata 1404 can reveal actual real-time data, using numbers and/or graphs, for these metrics that are likely contributing to the problem (e.g., eighty percent of IPHONE checkouts in France are being cancelled unexpectedly).

Similarly, additional user interaction can include an input 1406 that hovers over a section 824(3) of the tree map visual. In this example, the section represents a specific metric, but in other examples the section can represent an attribute. Based on the input 1406, metadata 1408 that further describes the underlying data associated with the section can be displayed. Again, the metadata 1408 can identify one or more metrics that include the largest percentage of votes from agents and/or the metadata 1408 can reveal actual real-time data, using numbers and/or graphs, for the a metric or an attribute.

Figure 15:
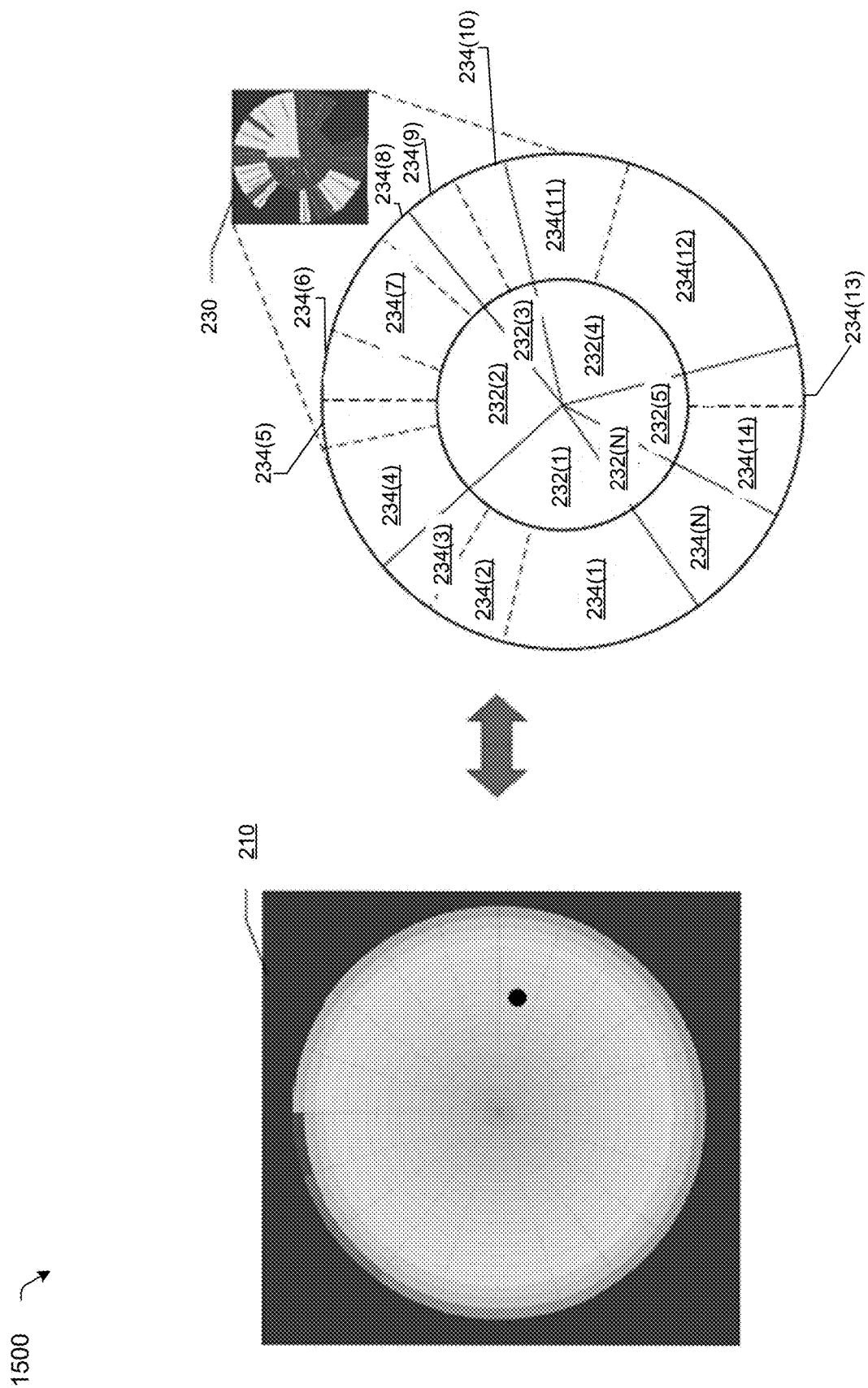
FIG. 15 is a diagram that illustrates a radar-based visual and alternative visual (e.g., a "sunburst" visual) that can be displayed on a user interface, and how the visuals can be used to localize a problem with a platform to a specific metric and/or a specific attribute being monitored.

FIG. 15 is a diagram 1500 that illustrates a radar-based visual 210 and alternative visual 230 (e.g., a "sunburst" visual). The alternative visual 230 can display representations of the hierarchical data on a user interface instead of the tree map visual in FIG. 8. The inside layer of alternative visual 230 includes the top level sections 232(1-N) (where N is a positive integer number that can be hundreds, thousands, etc.) that represent the individual attributes. As described above, the attributes can include specific countries or other locals, specific payment methods, specific devices, and so forth. The outside layer of the alternative visual 230 includes the low level sections 234(1-N) (where N is a positive integer number that can be hundreds, thousands, etc.) that represent the individual metrics being monitored. The sections 234(1-N) in the outer layer include the attribute in a section 232(1-N) of the inner layer to which they are graphically connected. For instance, the metrics represented by sections by 234(11) and 234(12) include the attribute represented by section 232(4).

As described above, a size and/or a color of an individual section in the alternative visual 230 can be used to indicate anomalous activity for a specific attribute and/or for a specific metric. That is, as an amount of anomalous activity grows, a size of a section will increase and/or the color may change. Consequently, the radar-based visual 210 and the alternative visual 230 can be used to localize a problem with a platform to a specific metric and/or a specific attribute being monitored. For example, the size of sections 232(4), 234(11), and/or 234(12) provides a visual indication that a problem is likely occurring with respect to the attribute represented by 232(4) and the problem may be specific to the metrics represented by sections 234(11) and 234(12).

In some examples, a user interface may include a toggle input so a user can switch between viewing a tree map visual, as described above, and the alternative visual 1504 (e.g., "sunburst" visual) illustrated in FIG. 15.

Figure 16:
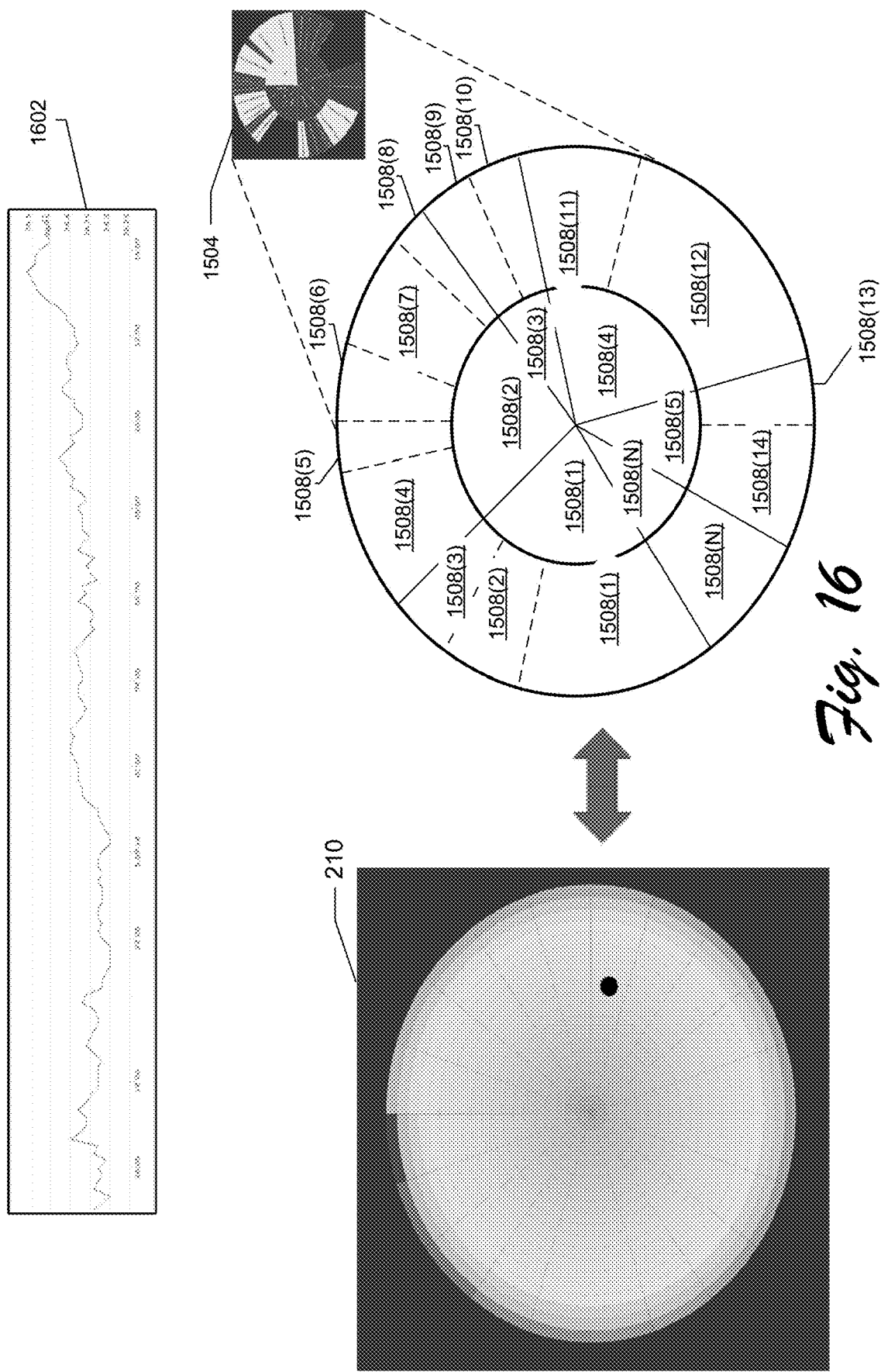
FIG. 16 is a diagram that illustrates the radar-based visual and the alternative visual of FIG. 15, as well as a timeline visual that shows an incident score for a recent period of time.

FIG. 16 is a diagram that illustrates the radar-based visual and the alternative visual of FIG. 15, as well as a timeline visual 1602 that shows an incident score for a recent period of time. The timeline visual 1602 may provide a good historic representation of an overall health of a platform during a handover period, when an on-duty Site Reliability Engineer is leaving and a new Site Reliability Engineer is arriving. Accordingly, the timeline visual 1602 plots a line graph of an incident score over a recent period of time (e.g., the last twenty-four hours, the last twelve hours, the last six hours, etc.). The incident score reflects errors in the expected data for the metrics being monitored. Accordingly, if the incident score increase over a period of time (e.g., an hour), then a user viewing the timeline visual 1602 can quickly see when a problem occurred, or is occurring.

Figure 17:
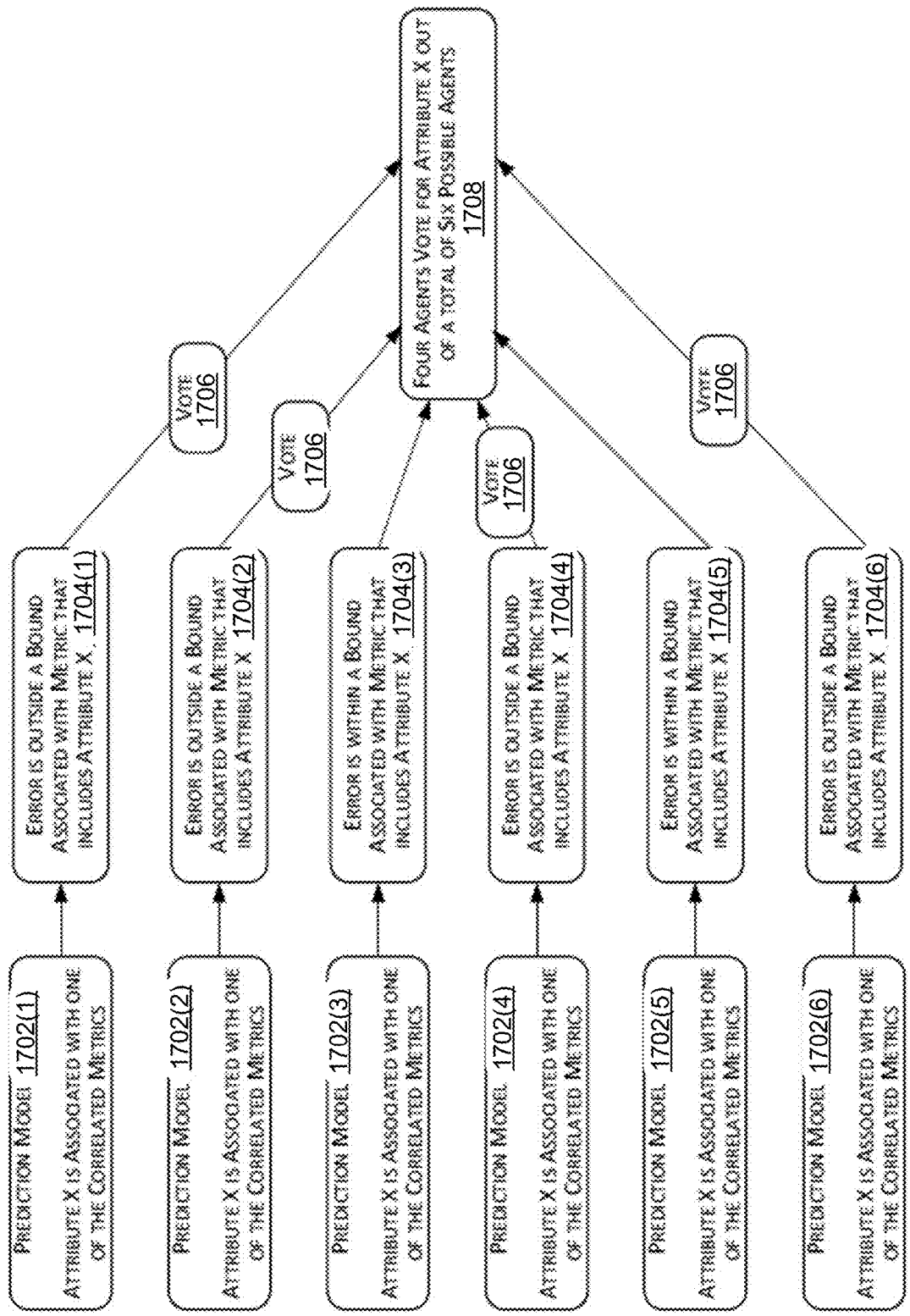
FIG. 17 is a diagram that illustrates an example of how the multi-agent system can be used to identify an attribute that may be associated with anomalous activity.

FIG. 17 is a diagram 1700 that illustrates an example of how the multi-agent system can be used to identify an attribute that may be associated with anomalous activity. FIG. 17 illustrates six prediction models 1702(1-6) within which at least one of the two correlated metrics includes a same attribute 'X' (e.g., a same attribute is shared by a metric in each of the prediction models 1702(1-6)). Six prediction models are illustrated for ease of discussion. However, hundreds or thousands of prediction models may likely be associated with each attribute via the correlated metrics contained therein. Note that the prediction models 1702(1-6) may include completely different metrics or overlapping metrics (e.g., the same metric may be used in more than one of the prediction models 1702(1-6)).

As described above, prediction model 1702(1) may determine that an error in predicting a metric value is outside a bound (e.g., the upper or the lower bound) associated with a metric that includes attribute 'X' 1704(1). Similarly, prediction model 1702(2) may determine that an error in predicting a metric value is outside a bound associated with a metric that includes attribute 'X' 1704(2), prediction model 1702(4) may determine that an error in predicting a metric value is outside a bound associated with a metric that includes attribute 'X' 1704(4), and prediction model 1702(6) may determine that an error in predicting a metric value is outside a bound associated with a metric that includes attribute 'X' 1704(6). Accordingly, prediction models 1702(1), 1702(2), 1702(4), 1702(6), as well as the error detection mechanisms described herein, become voting agents and submit votes 1706 for attribute 'X'. The votes signal anomalous activity associated with attribute 'X'.

However, prediction model 1702(3) produces an error that is within a bound (e.g., the upper or the lower bound) associated with a metric that includes attribute 'X' 1704(3). Similarly, prediction model 1702(5) produces an error that is within a bound (e.g., the upper or the lower bound) associated with a metric that includes attribute 'X' 1704(5). Accordingly, prediction models 1702(3), 1702(5) are not associated with agents that provide a vote. Consequently, four agents vote for attribute 'X' out of a total of six possible agents 1708.

Figure 18:
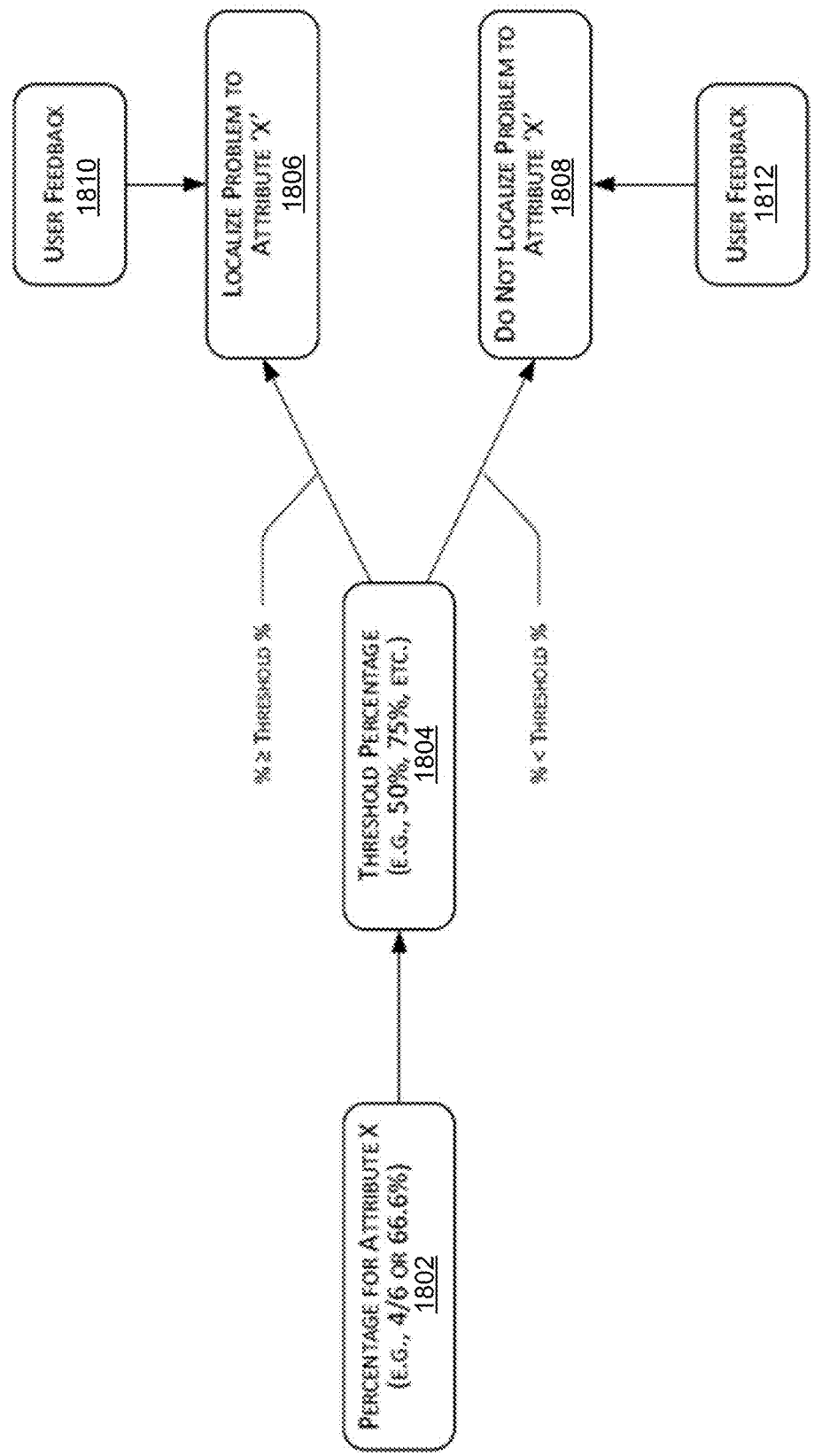
FIG. 18 is a diagram that illustrates an example of how a number of votes for an attribute can be compared to a threshold to determine that the attribute is likely associated with anomalous activity.

Continuing on to FIG. 18, a percentage 1802 is produced based on the number of voting agents and a total number or agents that share the attribute 'X' (e.g., 66.6%). The percentage is compared to a threshold percentage 1804 to determine whether a problem is likely localized to attribute 'X'. For example, if the threshold percentage is fifty percent, then the multi-agent voting system determines that a problem is likely localized to attribute 'X' 1806 (e.g., because 66.6% is greater than or equal to 50%). If the threshold percentage is seventy-five percent, then the multi-agent voting system lacks confidence to localize a problem to attribute 'X' 1808 (e.g., because 66.6% is less than 75%).

The multi-agent voting system can use the percentage determined for attribute 'X' and/or whether the percentage exceeds the threshold percentage as a basis for scaling a section in the tree map visual. For instance, a size of a section that represents attribute 'X' can increase and/or change colors as the percentage increases.

In various examples, user feedback can be used to update the QLGBT models used to drive the voting and/or the threshold percentage 1804 used to determine whether a problem is localized to a particular attribute. For example, a user may provide feedback 1812 indicating that there is no problem associated with attribute 'X' after the user provides further investigation based on the system's determination that a problem is likely localized to attribute 'X' 1806 (e.g., a false positive). Accordingly, the system can increase the threshold percentage for the particular attribute (e.g., attribute 'X') or the attribute type based on the feedback 1812. Additionally or alternatively, the system can adjust how the bounds are determined for prediction models 1702(1-6) by a predetermined factor (e.g., 5%, 10%, etc.) so a size of the confidence interval for the error is reduced.

In another example, a user may provide feedback 1810 indicating that there is a problem associated with attribute 'X' and the system failed to inform the user that the problem is likely localized to attribute 'X' 1806 (e.g., a false negative). Accordingly, the system can decrease the threshold percentage for the particular attribute (e.g., attribute 'X') or the attribute type based on the feedback 1810. Additionally or alternatively, the system can adjust how the bounds are determined for prediction models 1702(1-6) by a predetermined factor (e.g., 5%, 10%, etc.) so a size of the confidence interval for the error is expanded.

This system of multiple agents collaborating in parallel becomes highly customizable which enables continuous improvement and online learning. One example of such continuous improvement is that different voting agents can be assigned different weights, which can be updated over time based on user feedback. Another example of such continuous improvement is instead of using weights, a voting agent's upper and lower bounds can be multiplied by a relaxation factor to limit or increase its alerting frequency. Additionally, a user may choose to select one or more of the voting agents and remove them entirely from the system or replace them with new, separately trained, voting agents. This may be implemented, for example, to include newly added metrics to the system without resetting the training and deployment of the entire system.

Figure 19:
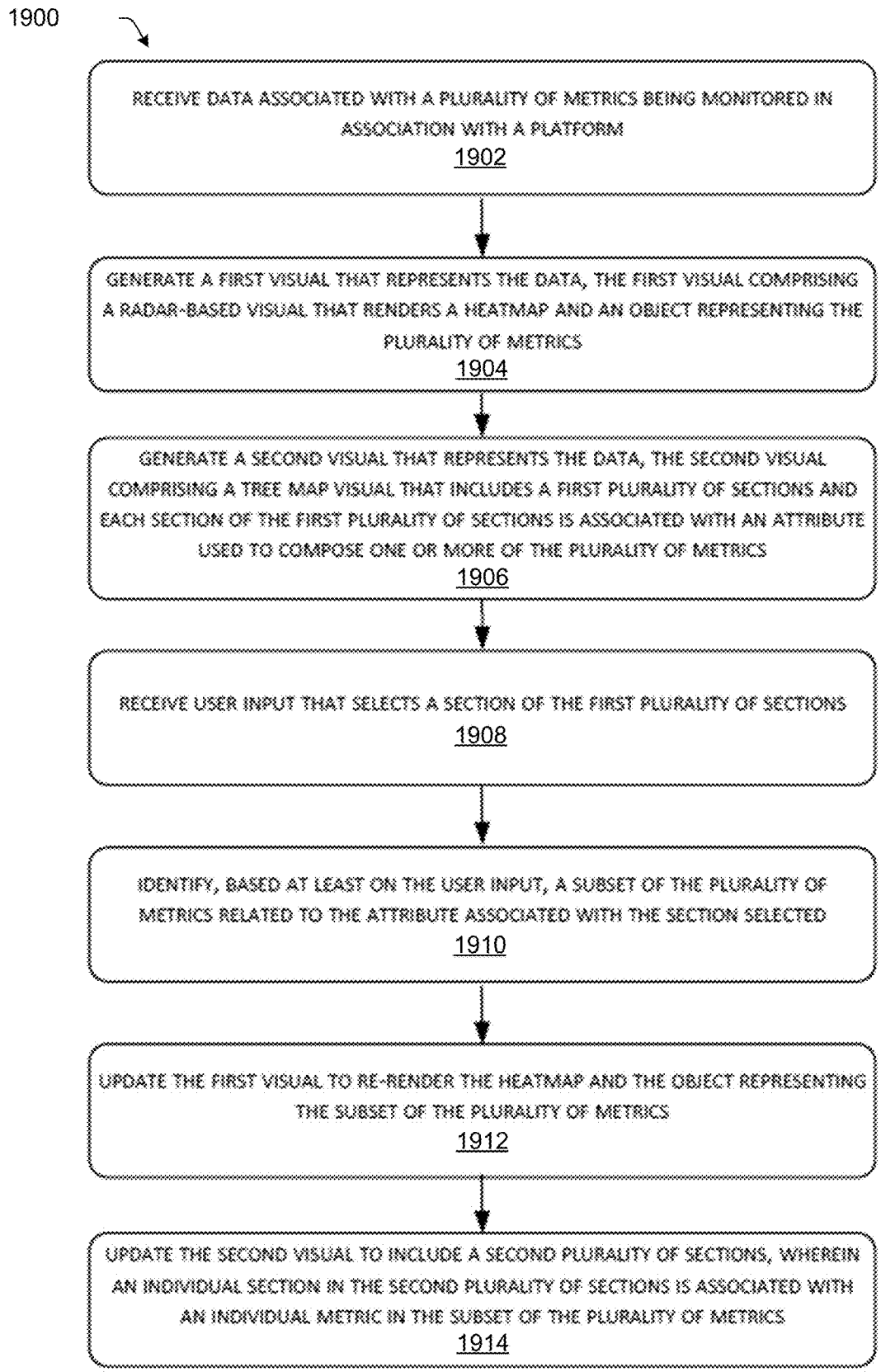
FIG. 19 is a flow diagram showing aspects of an illustrative method, according to one implementation disclosed herein.

FIG. 19 is a diagram illustrating aspects of method 1900 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-readable storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example methods described below are operating on a computing device, it can be appreciated that these methods can be performed on any computing system which may include a number of computing devices (e.g., servers) working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The method 1900 begins at operation 1902, which illustrates receiving data associated with a plurality of metrics being monitored in association with a platform. For example, the metrics being monitored may relate to a particular function or process of the platform, such as the ability for customers to purchase items via an electronic commerce site. In a more specific example, the metrics being monitored may relate to one or more of a customer being able to sign in, a customer being able to check out, and so forth.

Operation 1904 illustrates generating a first visual that represents the data. As described above, the first visual can include a radar-based visual that renders a heatmap and an object representing the plurality of metrics. The radar-based visual can provide a high-level indication of whether the platform is healthy based on the plurality of metrics. That is, movement of the object within the radar-based visual can signal normal activity or abnormal activity with respect to the plurality of metrics. Additionally or alternatively, a size of the object can signal normal activity or abnormal activity with respect to the plurality of metrics.

Operation 1906 illustrates generating a second visual that represents the data. The second visual can include a tree map visual that includes a first plurality of sections and each section of the first plurality of sections is associated with an attribute used to compose one or more of the plurality of metrics. As described in examples above, an attribute can relate to a location, a type of device, a type of payment method, and so forth.

Operation 1908 illustrates receiving user input that selects a section of the first plurality of sections. The user input may be provided in order to help a user attempt to localize a potential problem to a particular metric and/or a particular attribute.

Operation 1910 illustrates identifying, based at least on the user input, a subset of the plurality of metrics related to the attribute associated with the section selected.

Operation 1912 illustrates updating the first visual to re-render the heatmap and the object representing the subset of the plurality of metrics. This updated first visual can provide the user with a high-level indication of whether the platform is experiencing anomalous activity with respect to the subset of the plurality of metrics.

Operation 1914 illustrates updating the second visual to include a second plurality of sections. An individual section in the second plurality of sections is associated with an individual metric in the subset of the plurality of metrics.

FIG. 20 shows an example computer architecture for a computer capable of providing the functionality described herein such as, for example, a computing device configured to implement the functionality described above with reference to FIGS. 1-19. Thus, the computer architecture 2000 illustrated in FIG. 20 illustrates an architecture for a server computer or another type of computing device suitable for implementing the functionality described herein. The computer architecture 2000 might be utilized to execute the various software components presented herein to implement the disclosed technologies.

The computer architecture 2000 illustrated in FIG. 20 includes a central processing unit 2002 ("CPU"), a system memory 2004, including a random-access memory 2006 ("RAM") and a read-only memory ("ROM") 708, and a system bus 2010 that couples the memory 2004 to the CPU 2002. A firmware containing basic routines that help to transfer information between elements within the computer architecture 2000, such as during startup, is stored in the ROM 2008. The computer architecture 2000 further includes a mass storage device 2012 for storing an operating system 2014, other data, and one or more executable programs including, for example, the SOR module 204 and/or the voting module 206.

The mass storage device 2012 is connected to the CPU 2002 through a mass storage controller (not shown) connected to the bus 2010. The mass storage device 2012 and its associated computer-readable media provide non-volatile storage for the computer architecture 2000. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 2000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 2000. For purposes of the claims, the phrase "computer storage medium," "computer-readable storage medium" and variations thereof, does not include waves, signals, and/or other transitory and/or intangible communication media, per se.

According to various implementations, the computer architecture 2000 might operate in a networked environment using logical connections to remote computers through a network 2050. A computing device implementing the computer architecture 2000 might connect to the network 2050 through a network interface unit 2016 connected to the bus 2010. It should be appreciated that the network interface unit 2016 might also be utilized to connect to other types of networks and remote computer systems.

The computer architecture 2000 might also include an input/output controller 2018 for receiving and processing input from a number of other devices, including a keyboard, mouse, or electronic stylus. Similarly, the input/output controller 2018 might provide output to a display screen, a printer, or other type of output device.

It should be appreciated that the software components described herein might, when loaded into the CPU 2002 and executed, transform the CPU 2002 and the overall computer architecture 2000 from a general-purpose computing system into a special-purpose computing system customized to facilitate the functionality presented herein. The CPU 2002 might be constructed from any number of transistors or other discrete circuit elements, which might individually or collectively assume any number of states. More specifically, the CPU 2002 might operate as a finite-state machine, in response to executable instructions contained within the software modules disclosed herein. These computer-executable instructions might transform the CPU 2002 by specifying how the CPU 2002 transitions between states, thereby transforming the transistors or other discrete hardware elements constituting the CPU 2002.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 2000 in order to store and execute the software components presented herein. It also should be appreciated that the computer architecture 2000 might include other types of computing devices, including hand-held computers, embedded computer systems, personal digital assistants, and other types of computing devices known to those skilled in the art.

It is also contemplated that the computer architecture 2000 might not include all of the components shown in FIG. 20, might include other components that are not explicitly shown in FIG. 1 or 7, or might utilize an architecture completely different than that shown in FIG. 20. For example, and without limitation, the technologies disclosed herein can be utilized with multiple CPUs for improved performance through parallelization, graphics processing units ("GPUs") for faster computation, and/or tensor processing units ("TPUs"). The term "processor" as used herein encompasses CPUs, GPUs, TPUs, and other types of processors.

The disclosure presented herein also encompasses the subject matter set forth in the following clauses.

Example Clause A, a method comprising: determining that a first metric is correlated to a second metric; generating, by one or more devices, a prediction model for the first metric that is correlated to the second metric; obtaining errors of the prediction model; determining an upper bound and a lower bound on the errors of the prediction model; using the prediction model to predict a data value for the second metric from an actual data value for the first metric; comparing an actual data value for the second metric to the predicted data value for the second metric to determine a difference; determining that the difference is outside either the upper bound or the lower bound resulting in a voting agent signaling an anomaly associated with a voted metric; and displaying the anomaly associated with the voted metric.

Example Clause B, the method of Example Clause A, further comprising: determining a total number of agents that share an attribute with the voted metric; determining a number of voting agents from the total number of agents; generating a percentage for the attribute based on the number of voting agents and the total number of agents; determining that the percentage is greater than or equal to a threshold percentage; and determining that a problem associated with the anomaly is localized to the attribute based on the percentage being greater than or equal to the threshold percentage.

Example Clause C, the method of Example Clause B, wherein the attribute comprises one of a specific location, a type of device, or a type of payment method.

Example Clause D, the method of Example Clause B, wherein the attribute is related to a list of items being sold by a user of an electronic commerce site.

Example Clause E, the method of Example Clause A, further comprising: determining a total number of agents that share an attribute with the voted metric; determining a number of voting agents from the total number of agents; generating a percentage for the attribute based on the number of voting agents and the total number of agents; determining that the percentage is less than a threshold percentage; and determining that a problem associated with the anomaly is not localized to the attribute based on the percentage being less than the threshold percentage.

Example Clause F, the method of any one of Example Clauses A through E, wherein: a first Quantile-Loss Gradient Boosted Tree (QLGBT) error thresholding model is used to determine the upper bound on the errors of the prediction model; and a second QLGBT error thresholding model is used to determine the lower bound on the errors of the prediction model.

Example Clause G, the method of Example Clause F, further comprising categorizing one of the first QLGBT error thresholding model or the second QLGBT error thresholding model as the voting agent which signals the anomaly associated with the voted metric.

Example Clause H, the method of any one of Example Clauses A through G, further comprising evaluating a plurality of metrics to determine that the first metric is correlated to the second metric.

Example Clause I, a system comprising: one or more processing units; and computer-readable storage media storing instructions that, when executed by the one or more processing units, cause the system to perform operations comprising: determining that a first metric is correlated to a second metric; generating a prediction model for the first metric that is correlated to the second metric; obtaining errors of the prediction model; determining an upper bound and a lower bound on the errors of the prediction model; using the prediction model to predict a data value for the second metric from an actual data value for the first metric; comparing an actual data value for the second metric to the predicted data value for the second metric to determine a difference; determining that the difference is outside either the upper bound or the lower bound resulting in a voting agent signaling an anomaly associated with a voted metric; and displaying the anomaly associated with the voted metric.

Example Clause J, the system of Example Clause I, wherein the operations further comprise: determining a total number of agents that share an attribute with the voted metric; determining a number of voting agents from the total number of agents; generating a percentage for the attribute based on the number of voting agents and the total number of agents; determining that the percentage is greater than or equal to a threshold percentage; and determining that a problem associated with the anomaly is localized to the attribute based on the percentage being greater than or equal to the threshold percentage.

Example Clause K, the system of Example Clause J, wherein the attribute comprises one of a specific location, a type of device, or a type of payment method.

Example Clause L, the system of Example Clause J, wherein the attribute is related to a list of items being sold by a user of an electronic commerce site.

Example Clause M, the system of Example Clause I, wherein the operations further comprise: determining a total number of agents that share an attribute with the voted metric; determining a number of voting agents from the total number of agents; generating a percentage for the attribute based on the number of voting agents and the total number of agents; determining that the percentage is less than a threshold percentage; and determining that a problem associated with the anomaly is not localized to the attribute based on the percentage being less than the threshold percentage.

Example Clause N, the system of any one of Example Clauses I through M, wherein: a first Quantile-Loss Gradient Boosted Tree (QLGBT) error thresholding model is used to determine the upper bound on the errors of the prediction model; and a second QLGBT error thresholding model is used to determine the lower bound on the errors of the prediction model.

Example Clause O, the system of Example Clause N, wherein the operations further comprise categorizing one of the first QLGBT error thresholding model or the second QLGBT error thresholding model as the voting agent which signals the anomaly associated with the voted metric.

Example Clause P, the system of any one of Example Clauses I through O, further comprising evaluating a plurality of metrics to determine that the first metric is correlated to the second metric.

Example Clause Q, computer-readable storage media comprising instructions that, when executed by one or more processing units, cause a system to perform operations comprising: determining that a first metric is correlated to a second metric; generating a prediction model for the first metric that is correlated to the second metric; obtaining errors of the prediction model; determining an upper bound and a lower bound on the errors of the prediction model; using the prediction model to predict a data value for the second metric from an actual data value for the first metric; comparing an actual data value for the second metric to the predicted data value for the second metric to determine a difference; determining that the difference is outside either the upper bound or the lower bound resulting in a voting agent signaling an anomaly associated with a voted metric; and displaying the anomaly associated with the voted metric.

Example Clause R, the computer-readable storage media of Example Clause Q, wherein the operations further comprise: determining a total number of agents that share an attribute with the voted metric; determining a number of voting agents from the total number of agents; generating a percentage for the attribute based on the number of voting agents and the total number of agents; determining that the percentage is greater than or equal to a threshold percentage; and determining that a problem associated with the anomaly is localized to the attribute based on the percentage being greater than or equal to the threshold percentage.

Example Clause S, the computer-readable storage media of Example Clause R, wherein the attribute comprises one of a specific location, a type of device, or a type of payment method.

Example Clause T, the computer-readable storage media of any one of Example Clauses Q through S, wherein: a first Quantile-Loss Gradient Boosted Tree (QLGBT) error thresholding model is used to determine the upper bound on the errors of the prediction model; a second QLGBT error thresholding model is used to determine the lower bound on the errors of the prediction model; and the operations further comprise categorizing one of the first QLGBT error thresholding model or the second QLGBT error thresholding model as the voting agent which signals the anomaly associated with the voted metric.

The terms "a," "an," "the" and similar referents used in the context of describing the techniques (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different metrics, two different visuals, etc.).

It is to be appreciated that conditional language used herein such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an element may be either X, Y, or Z, or a combination thereof.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. Although the inventive subject matter has been described with reference to specific example implementations, it will be evident that various modifications and changes may be made to these implementations without departing from the broader scope of the invention. Accordingly, the specification and drawings are to be regarded in an illustrative rather than a restrictive sense. The accompanying drawings that form a part hereof, show by way of illustration, and not of limitation, specific implementations in which the subject matter may be practiced. The implementations illustrated are described in sufficient detail to enable those skilled in the art to practice the teachings disclosed herein. Other implementations may be utilized and derived therefrom, such that structural and logical substitutions and changes may be made without departing from the scope of this disclosure. This Detailed Description, therefore, is not to be taken in a limiting sense, and the scope of various implementations is defined only by the appended claims, along with the full range of equivalents to which such claims are entitled.

Implementations of the inventive subject matter may be referred to herein, individually and/or collectively, by the term "invention" merely for convenience and without intending to voluntarily limit the scope of this application to any single invention or inventive concept if more than one is in fact disclosed. Thus, although specific implementations have been illustrated and described herein, it should be appreciated that any arrangement calculated to achieve the same purpose may be substituted for the specific implementations shown. This disclosure is intended to cover any and all adaptations or variations of various implementations. Combinations of the above implementations, and other implementations not specifically described herein, will be apparent to those of skill in the art upon reviewing the above description.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    receiving, by the computing device, data describing a plurality of metrics being monitored for a platform;
    generating, by the computing device, an operational visual that represents the data and comprises a circular visual, the circular visual comprising a heatmap arranging the plurality of metrics and an object representing a combination of the plurality of metrics within the heatmap, a first size of the object with respect to the operational visual indicating a degree to which real-time data for at least one of the plurality of metrics is anomalous to observed historic data for the at least one of the plurality of metrics;
    rendering, by the computing device, the operational visual;
    receiving, by the computing device, a user input selecting one or more simulation settings to apply to the operational visual;
    generating, by the computing device, based at least on the user input, simulated data of a simulated state of the platform for one or more of the plurality of metrics under the one or more simulation settings selected;
    re-generating, by the computing device, the operational visual, based on the simulated data, to represent the simulated state of the platform as an updated operational visual comprising the object, a second size of the object with respect to the updated operational visual indicating a degree to which the simulated data for at least one of the plurality of metrics under the one or more simulation settings is anomalous to observed historic data for the at least one of the plurality of metrics; and
    rendering, by the computing device, the updated operational visual.

2. The method of claim 1, wherein the user input is received via an interactive slider.

3. The method of claim 1, wherein the operational visual comprises an alternative visual that comprises a plurality of sections and each section of the plurality of sections is associated with a performance metric, wherein the each section of the plurality of sections is dynamically colored to indicate performance with respect to the performance metric, and dynamically changes colors in real-time as the user input is received.

4. The method of claim 1, wherein the plurality of metrics represent performance indicators.

5. The method of claim 4, further comprising:
    receiving, by the computing device, a user selection of the object; and
    rendering, by the computing device, a web diagram that overlays the operational visual to visualize a representation of a relationship between a performance metric value of the object as compared with other performance metric values for the object.

6. The method of claim 1, wherein the operational visual comprises a tree map visual that comprises a plurality of sections and each section of the plurality of sections is associated with an attribute used to compose one or more of the plurality of metrics.

7. The method of claim 6, wherein at least one of a size or a color of a section of the plurality of sections indicates an amount of anomalous activity for the attribute associated with the section.

8. The method of claim 1, wherein a location of the object on the circular visual signals anomalous activity associated with the plurality of metrics as the location of the object moves from a centrally located region of the circular visual towards a periphery region of the circular visual over time.

9. The method of claim 1, wherein a location of the object on the circular visual signals normal activity associated with the plurality of metrics as the location of the object remains within a set of centrally located regions of the circular visual over time.

10. A system comprising:
- a data manager module implemented at least partially in hardware of a computing device to receive data describing a plurality of metrics being monitored for a platform;
- a visual manager module implemented at least partially in the hardware of the computing device to generate an operational visual that represents the data and comprises a circular visual, the circular visual comprising a heatmap arranging the plurality of metrics and an object representing a combination of the plurality of metrics within the heatmap, a first size of the object with respect to the operational visual indicating a degree to which real-time data for at least one of the plurality of metrics is anomalous to observed historic data for the at least one of the plurality of metrics;
- a visual rendering module implemented at least partially in the hardware of the computing device to render the operational visual;
- a user interface module implemented at least partially in the hardware of the computing device to receive a user input selecting one or more simulation settings to apply to the operational visual;
- a simulation manager module implemented at least partially in the hardware of the computing device to generate based at least on the user input, simulated data of a simulated state of the platform for one or more of the plurality of metrics under the one or more simulation settings selected;
- a visual updater module implemented at least partially in the hardware of the computing device to re-generate the operational visual, based on the simulated data, to represent the simulated state of the platform as an updated operational visual comprising the object, a second size of the object with respect to the updated operational visual indicating a degree to which the simulated data for at least one of the plurality of metrics under the one or more simulation settings is anomalous to observed historic data for the at least one of the plurality of metrics; and
- a visual re-rendering module implemented at least partially in the hardware of the computing device to render the updated operational visual.

11. The system of claim 10, wherein the operational visual is generated using an unsupervised artificial neural network algorithm that projects high-dimensional data onto a two-dimensional map.

12. The system of claim 11, wherein the unsupervised artificial neural network algorithm comprises a self-organizing map (SOM) algorithm that accounts for time-series data and alters an output representation so that a symmetric circular visual is displayed.

13. The system of claim 10, wherein the user input is a recognized gesture or utterance.

14. The system of claim 10, wherein the one or more simulation settings comprises a traffic simulation setting.

15. The system of claim 10, wherein the one or more simulation settings comprises a future point in time.

16. Computer-readable storage media comprising instructions that, when executed by one or more processing units, cause a system to perform operations comprising:
- receiving data describing a plurality of metrics being monitored for a platform;
- generating an operational visual that represents the data and comprises a circular visual, the circular visual comprising a heatmap arranging the plurality of metrics and an object representing a combination of the plurality of metrics within the heatmap, a first size of the object with respect to the operational visual indicating a degree to which real-time data for at least one of the plurality of metrics is anomalous to observed historic data for the at least one of the plurality of metrics;
- rendering the operational visual; receiving a user input selecting one or more simulation settings to apply to the operational visual;
- generating based at least on the user input, simulated data of a simulated state of the platform for one or more of the plurality of metrics under the one or more simulation settings selected;
- re-generating the operational visual, based on the simulated data, to represent the simulated state of the platform as an updated operational visual comprising the object, a second size of the object with respect to the updated operational visual indicating a degree to which the simulated data for at least one of the plurality of metrics under the one or more simulation settings is anomalous to observed historic data for the at least one of the plurality of metrics; and
- rendering the updated operational visual.

17. The computer-readable storage media of claim 16, wherein the plurality of metrics represent performance indicators of a plurality of systems.

18. The computer-readable storage media of claim 16, wherein the operational visual is generated at least in part by using a multi-agent voting system of Quantile Loss Gradient Boosted Trees (QLGBT) machine learning model-based agents.

19. The computer-readable storage media of claim 16, wherein the operational visual comprises a plurality of sections and each section of the plurality of sections is associated with a performance metric used to compose one or more of the plurality of metrics.

20. The computer-readable storage media of claim 19, wherein at least one of a size or a color of a section of the plurality of sections indicates an amount of anomalous activity for an attribute associated with the section.

* * * * *